(12) United States Patent
Toyoda et al.

(10) Patent No.: US 7,542,212 B2
(45) Date of Patent: Jun. 2, 2009

(54) ZOOM LENS AND IMAGE CAPTURE APPARATUS

(75) Inventors: Koji Toyoda, Kanagawa (JP); Yusuke Nanjo, Kanagawa (JP); Shinichi Arita, Tokyo (JP)

(73) Assignee: Sony Corporation (JP)

( * ) Notice: Subject to any disclaimer, the term of this patent is extended or adjusted under 35 U.S.C. 154(b) by 244 days.

(21) Appl. No.: 11/802,320

(22) Filed: May 22, 2007

(65) Prior Publication Data

US 2007/0279760 A1    Dec. 6, 2007

(30) Foreign Application Priority Data

Jun. 1, 2006    (JP) ............................ P2006-153511

(51) Int. Cl.
*G02B 15/14*    (2006.01)
(52) U.S. Cl. .................. 359/676; 359/683; 359/684
(58) Field of Classification Search .............. 359/676, 359/684
See application file for complete search history.

(56) References Cited

U.S. PATENT DOCUMENTS

| | | | | |
|---|---|---|---|---|
| 5,818,646 A * | 10/1998 | Hamano | ...................... | 359/684 |
| 7,158,313 B2 * | 1/2007 | Chang | ......................... | 359/676 |
| 2006/0139765 A1 * | 6/2006 | Sano | ........................... | 359/676 |

FOREIGN PATENT DOCUMENTS

| JP | 04-13109 | 1/1992 |
|---|---|---|
| JP | 04-013109 A | 1/1992 |
| JP | 04-013110 A | 1/1992 |
| JP | 04-78809 | 3/1992 |
| JP | 05-264902 A | 10/1993 |
| JP | 06-88940 | 3/1994 |
| JP | 06-265785 A | 9/1994 |
| JP | 11-044845 A | 2/1999 |
| JP | 2000-089111 | 3/2000 |
| JP | 2001-033694 | 2/2001 |

OTHER PUBLICATIONS

European Search Report; Application No./Patent No. 07252148.7—2217; Dated: Sep. 7, 2007.

* cited by examiner

*Primary Examiner*—Jordan M. Schwartz
(74) *Attorney, Agent, or Firm*—Rader Fishman & Grauer PLLC; Ronald P. Kananen

(57) ABSTRACT

A zoom lens includes in order and from the side of an object, a first lens group having a positive refractive power and fixed in position, a second lens group having a negative refractive power and movable in position for providing mainly zooming, a third lens group having a positive refractive power and fixed in position, a fourth lens group having a positive refractive power and movable in position for performing a focal position correction due to the zooming and for focusing, and a fifth lens group including a single lens fixed in position.

Each of the lens groups from the third lens group to the fifth lens group has at least one aspheric surface, and conditional equations (1) and (2) below are satisfied.

$$|f4/f5|<0.12 \qquad (3)$$

$$0.9<\beta5<1.2 \qquad (4)$$

where f4 is a focal length of the fourth lens group, f5 is a focal length of the fifth lens group, and β5 is a transverse magnification of the fifth lens group.

4 Claims, 25 Drawing Sheets

ZOOM LENS AND IMAGE CAPTURE APPARATUS

BACKGROUND OF THE INVENTION

1. Field of the Invention

The present invention relates to a zoom lens and image capture apparatus. More specifically, the present invention relates to a zoom lens that provides a higher performance and a higher zoom ratio while having a small size, as well as to an image capture apparatus equipped with such a zoom lens.

2. Description of Related Art

In recent years, small-size image capture apparatuses such as consumer video cameras and digital video cameras have been wide spread for household use. For the small-size image capture apparatuses of this type, portability is taken into serious consideration. Miniaturization is always desired as well as a higher image quality. For that reason, with respect to image-capturing lenses, particularly zoom lenses respectively mounted in the small-size image capture apparatuses, there is a need for a smaller size as well as enhancement of lens performances. The smaller size may be achieved, for example, by reducing an overall length and/or width. Further, there is also a great recent demand for a higher zoom ratio. It becomes more difficult to find appropriate designs adaptable to meet such demands for the miniaturization, the higher image quality and the higher zoom ratio.

Such being the case, in Japanese Patent Application Publication No. JP 2000-89111 (hereinbelow, referred to as Patent Document 1), for instance, a zoom lens is disclosed, which includes, in order and from the side of an object, a first lens group having a positive refractive power, a second lens group having a negative refractive power, a third lens group having a positive refractive power, a fourth lens group having a positive refractive power and a fifth lens group having a refractive power approximately close to nil. The third lens group is configured with a cemented lens of a convex lens and a concave lens, and the fifth lens group is configured with a cemented lens of a concave lens and a convex lens. Use of a lens configuration of this type allows to achieve a optical zoom ratio as high as ten times.

In Japanese Patent Application Publication No. JP 2001-33694 (hereinbelow, referred to as Patent Document 2), a zoom lens of a different type is disclosed, which includes, in order and from the side of an object, a first lens group having a positive refractive power, a second lens group having a negative refractive power, a third lens group having a positive refractive power, a fourth lens group having a positive refractive power, and a fifth lens group having a positive refractive power. The fifth lens group is configured so as to have a lens surface that is in a spherical or plane shape. Use of a lens configuration of this type allows to achieve a optical zoom ratio as high as twenty-five times.

SUMMARY OF THE INVENTION

However, in the zoom lenses for the video cameras in the related art, particularly, along with an attempt to provide a higher zoom ratio, there are following issues.

The zoom lenses in the related art have been designed so as to realize satisfactory optical performances, with an object distance of infinity, over a whole zooming range from a maximum wide-angle state to a maximum telephoto state. The lens configuration is determined so as to fulfill desired optical performances, with the miniaturization taken into considerations as well as the higher zoom ratio and the like.

In the zoom lenses disclosed in the Patent Documents 1 and 2, by taking the lens configuration including five lens groups, it has become possible to fulfill the satisfactory optical performances as desired, while bringing the higher zoom ratio to realization.

However, as the zoom ratio becomes higher, particularly, in a telephoto side where a high zoom ratio is required, variation in the curvature of field resulting from a change of the object distance becomes greater in excess of its negligible amount. This fact brings about, with respect to the maximum telephoto state, for instance, such a state where a periphery of an image gradually becomes out of focus, as the object distance becomes smaller. In addition, this fact is naturally followed by an issue in that the higher an image height is, in other words, the greater a size of imagers such as CCDs (Charge Coupled Devices) is, the greater is an amount of the curvature of field as well. Accordingly, effects on an image quality increase. Such being the case, in regard to a demand for higher pixel density with the increase of the imager size, if variation due to the change in the object distance is to be suppressed, it becomes more difficult to fulfill the miniaturization or the like. More specifically, as the object distance becomes smaller, the curvature of field falls down toward an underside. This fact causes the periphery of the image to be out of focus, resulting in an out-of-focus image. It is unfavorable for capturing an image of a subject whose distance changes greatly, because a manner of out-of-focus in the periphery of the image undergoes a large change as well.

In the zoom lenses disclosed in the Patent Documents 1 and 2, either of the fourth and the fifth lens groups, which are effective in correcting the curvature of field for an overall optical system and the variation of the curvature of field resulting from the change of the object distance, has been merely formed with the spherical or plane shape, and/or allocation of the refractive powers has been not suitable for the respective lens groups. For that reason, no satisfactory correction has been brought to realization. Particularly, as the zoom ratio and the pixel density are made higher, their effects become more prominent. As a result, there has arisen a serious issue in realizing a zoom lens that provides a high zoom ratio while having a small size.

Accordingly, it is desirable to provide, in relation to zoom lenses suitable for small-size image capture apparatuses such as consumer video cameras and digital video cameras, a zoom lens that provides a high image quality and a high zoom ratio while having a small size, and an image capture apparatus equipped with such a zoom lens. The present invention has been undertaken in view of the issues.

A zoom lens according to one embodiment of the present invention includes, in order and from the side of an object, a first lens group having a positive refractive power and fixed in position, a second lens group having a negative refractive power and movable in position for providing mainly zooming, a third lens group having a positive refractive power and fixed in position, a fourth lens group having a positive refractive power and movable in position for performing a focal position correction due to the zooming and to provide focusing, and a fifth lens group including a single lens fixed in position. In the zoom lens, each of the lens groups from the third lens group to the fifth lens group has at least one aspherical surface, and conditional equations (1) and (2) shown below are satisfied.

$$|f4/f5|<0.12 \tag{1}$$

$$0.9<\beta5<1.2 \tag{2}$$

where f4 is a focal length of the fourth lens group, f5 is a focal length of the fifth lens group, and β5 is a transverse magnification of the fifth lens group.

An image capture apparatus according to another embodiment of the present invention includes a zoom lens, and an imaging device for converting an optical image formed by the zoom lens into electric signals. The zoom lens includes, in order and from the side of an object, a first lens group having a positive refractive power and fixed in position, a second lens group having a negative refractive power and movable in position for providing mainly zooming, a third lens group having a positive refractive power and fixed in position, a fourth lens group having a positive refractive power and movable in position for performing a focal position correction due to the zooming and to provide focusing, and a fifth lens group including a single lens fixed in position. Each of the lens groups from the third lens group to the fifth lens group has at least one aspherical surface, and conditional equations (1) and (2) shown below are satisfied.

$$|f4/f5|<0.12 \qquad (1)$$

$$0.9<\beta5<1.2 \qquad (2)$$

According to the present invention, a high image quality and a high zoom ratio can be achieved with a small device size.

DETAILED DESCRIPTION OF EMBODIMENTS

Figure 1:
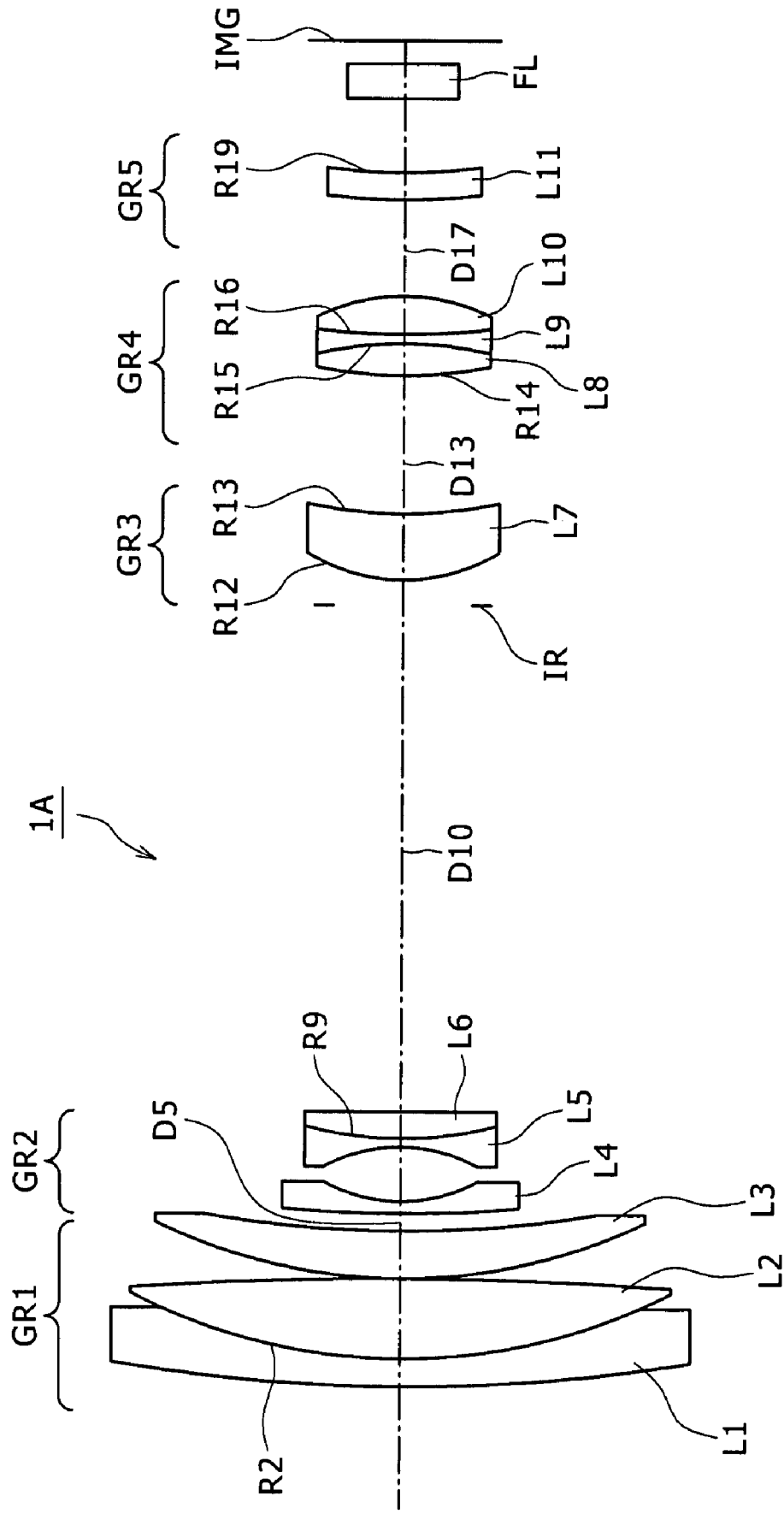
FIG. 1 shows a lens configuration of a first embodiment of a zoom lens according to the present invention.

Hereinafter, embodiments of a zoom lens and an image capture apparatus according to the present invention are described with reference to drawings and tables.

First, the zoom lens according to an embodiment of the present invention is described.

The zoom lens of the present embodiment includes, in order and from the side of an object, a first lens group having a positive refractive power and fixed in position, a second lens group having a negative refractive power and movable in position for providing mainly zooming, a third lens group having a positive refractive power and fixed in position, a fourth lens group having a positive refractive power and movable in position for performing a focal position correction due to the zooming and to provide focusing, and a fifth lens group including a single lens fixed in position. In the zoom lens, each of the lens groups from the third lens group to the fifth lens group has at least one aspherical surface, and conditional equations (1) and (2) shown below are satisfied.

$$|f4/f5|<0.12 \quad (1)$$

$$0.9<\beta 5<1.2 \quad (2)$$

where f4 is a focal length of the fourth lens group, f5 is a focal length of the fifth lens group, and $\beta 5$ is a transverse magnification of the fifth lens group.

The above-described lens configuration enables a high image quality and a high zoom ratio to be achieved, with a small device size.

More specifically, by properly setting a ratio or a power (refractive power) ratio of the focal length f4 of the fourth lens group to the focal length f5 of the fifth lens group, it is possible to control an exit pupil position in a telephoto side, and obtain a satisfactory peripheral brightness ratio (shading) of an output image. Furthermore, the above-described lens configuration allows to correct the spherical aberration and the coma aberration in the wide-angle side or the telephoto side, enabling to achieve a satisfactory resolution. Further, by properly setting the transverse magnification of the fifth lens group, the lens configuration allows to correct the spherical aberration and the coma aberration over a zooming range from a maximum wide-angle state to a vicinity of a mid-focal length, thereby enabling to achieve the satisfactory resolution. Furthermore, the lens configuration allows to control the exit pupil position in the telephoto side, thereby enabling to obtain the satisfactory peripheral brightness ratio (shading) of the output image. Furthermore, the lens configuration allows to correct the spherical aberration and the coma aberration over the range from the maximum wide-angle state to the maximum telephoto state, thereby enabling to achieve the satisfactory resolution.

The conditional equation (1) is to properly set the ratio or the power (refractive power) ratio of the focal length f4 of the fourth lens group to the focal length f5 of the fifth lens group.

When a value of |f4/f5| is more than its upper limit, the refractive power of the fifth lens group becomes too strong. As a result, the exit pupil position in the telephoto side is brought extremely closer to an image plane. For that reason, with influence of a structural issue of imagers such as CCDs and CMOSs (Complementary Metal-Oxide Semiconductors), the peripheral brightness ratio (shading) of the output image grows worse. The spherical aberration and the coma aberration in the wide-angle side or the telephoto side may also become degraded, causing the resolution to be reduced.

The conditional equation (2) is to properly set the transverse magnification $\beta 5$ of the fifth lens group.

When a value of $\beta 5$ is more than its upper limit, the refractive power of the fourth lens group becomes too strong. The spherical aberration and the coma aberration become degraded over the zooming range from the maximum wide-angle state to the vicinity of the mid-focal length, causing the resolution to be reduced. Conversely, when the value of $\beta 5$ is less than its lower limit, the refractive power of the fourth lens group becomes weaker, and the refractive power of the fifth lens group becomes too strong. As a result, the exit pupil position in the telephoto side is brought extremely closer to the image plane, causing the peripheral brightness ratio (shading) of the output image to grow worse. There also happens an increase of the spherical aberration and the coma aberration over the range from the maximum wide-angle state to the maximum telephoto state, followed by degradation of the resolution as well.

In one embodiment of the zoom lens of the present invention, it is desirable that the third lens group be configured with a single lens having a positive refractive power, and that the fourth lens group be configured with a triple cemented lens, which is of a lens having a positive refractive power, a lens having a negative refractive power and a lens having a positive refractive power.

The refractive power of a concave lens included in the fourth lens group in order to be responsible for achromatic effects with respect to the latter lens groups followed by the third lens group is to be determined depending on achromatic requirements. However, by cementing a convex lens to the front and the rear of the concave lens respectively, it becomes possible to increase a degree of freedom acceptable to a radius of curvature of the concave lens, permitting the aberration that occurs from each surface of the concave lens to be minimized. In addition, by cementing the lenses to each other, factors of errors such as misalignment that occurs during assembling are reduced, which makes it possible to suppress optical performance degradation that may occur at a manufacturing stage, resulting in simplification of a manufacturing process. These facts enable manufacturing of a zoom lens that provides a high image quality and a high zoom ratio with a small device size.

In one embodiment of the zoom lens of the present invention, it is desirable that the shape of an aspherical surface included in the fifth lens group should meet conditional equations (3) and (4) shown below, assuming that MTa is a curvature of field in a meridional direction with respect to a maximum image height at the maximum telephoto state, MTs is a curvature of field in a meridional direction with respect to the maximum image height at the maximum telephoto state when the aspherical surface included in the fifth lens group is replaced with a paraxial spherical surface thereof, STa is the spherical aberration that occurs during full-aperture at the maximum telephoto state, and STs is the spherical aberration that occurs during full-aperture at the maximum telephoto state when the aspherical surface included in the fifth lens group is replaced with the paraxial spherical surface thereof.

$$|MTa/MTs|<1.0 \quad (3)$$

$$|(STa-STs)/STa|<1.0 \quad (4)$$

Accordingly, by properly setting the power (refractive power) ratio of the fourth lens group to the fifth lens group, and properly setting the shape of the aspherical surface included in the fifth lens group, the aspherical surface included in the fifth lens group takes a share in correcting the curvature of field for the overall optical system, and the aspherical surface included in the fourth lens group takes a share in reducing the fluctuation of the curvature of field resulting from the change of the object distance, permitting achievement of a zoom lens that provides a high image quality and a high zoom ratio with a small device size.

The conditional equation (3) is to properly set the shape of the aspherical surface included in the fifth lens group.

When a value of |MTa/MTs| is more than its upper limit, the aspherical surface becomes less effective in correcting the curvature of field. The fluctuation of the curvature of field resulting from the change of the object distance fails to be completely suppressed, and the effects of the fluctuation on an image cannot become negligible.

The conditional equation (4) is to properly set the shape of the aspherical surface included in the fifth lens group.

When a value of |STa/STs| is more than its upper limit, the refractive power according to the aspherical surface effect becomes too strong. The spherical aberration in the telephoto side becomes degraded, followed by the reduction of the resolution at a center part of a display. Or, the coma aberration at a peripheral part of the display becomes degraded over the range from the maximum wide-angle state to the maximum telephoto state, causing the resolution to be reduced over a wide range of zooming.

Specific embodiments of the zoom lens of the present invention and numerical embodiments provided by application of specific numerical values to the specific embodiments are now described with reference to drawings and tables.

It is noted that the aspherical surface is introduced in each of the embodiments, and the shape of the aspherical surface is to be defined by an equation 1 shown below, assuming that [Xi] is coordinates in a direction of an optical axis of an aspherical surface with respect to an $i^{th}$ surface, [Ci] is a paraxial curvature (a reciprocal of the radius of curvature) with respect to the $i^{th}$ surface, and [Y] is a distance from the optical axis.

$$xi=(Ci \cdot Y^2)/\{1+(1-Ci^2 \cdot Y^2)^{1/2}\}+A4 \cdot Y^4+A6 \cdot Y^6+A8 \cdot Y^8+A10+Y^{10}$$
[Equation 1]

In the equation 1, A4, A6, A8 and A10 respectively represent the fourth-, sixth-, eighth- and tenth-order aspherical coefficients.

Each of zoom lenses 1A (FIG. 1), 1B (FIG. 9) and 1C (FIG. 17) according to the first, the second and the third embodiments includes, in order and from the side of an object, a first lens group GR1 having a positive refractive power and fixed in position, a second lens group GR2 having a negative refractive power and movable in position for providing mainly zooming, a third lens group GR3 having a positive refractive power and fixed in position, a fourth lens group GR4 having a positive refractive power and movable in position for movement in the direction of an optical axis for performing a focal position correction due to the zooming and to provide focusing, and a fifth lens group GR5 configured with a single lens fixed in position. Each of the lens groups from the third lens group GR3 to the fifth lens group GR5 has at least one aspherical surface.

Details with respect to each of the embodiments are now described.

The zoom lens 1A according to the first embodiment includes eleven lenses in total, as shown in FIG. 1.

The first lens group GR1 has the positive refractive power on the whole, and is configured with three lenses L1, L2 and L3. It is noted that with respect to the lenses L1 and L2, a concave surface and a convex surface that are respectively on an image-plane side of the lens L1 and an object side of the lens L2 and have the same radius of curvature are cemented together into a cemented lens having a cemented surface R2.

The second lens group GR2 has the negative refractive power on the whole, and is configured with three lenses L4, L5 and L6. The second lens group GR2 is movable in position for movement in the direction of the optical axis for providing mainly zooming. It is noted that with respect to the lenses L5 and L6, a concave surface and a convex surface that are respectively on an image-plane side of the lens L5 and an object side of the lens L6 and have the same radius of curvature are cemented together into a cemented lens having a cemented surface R9.

The third lens group GR3 is configured with a single lens of a lens L7 having a positive refractive power, and the lens L7 is in the shape of a meniscus lens having a convex surface turned toward the object. The lens L7 is configured such that its opposite surfaces R12 and R13 are both aspherical.

The fourth lens group GR4 has the positive refractive power on the whole, and is configured with three lenses L8, L9 and L10. The fourth lens group GR4 is movable in position for movement in the direction of the optical axis for performing a focal position correction due to the zooming and for focusing. It is noted that with respect to the lenses L8, L9 and L10, their surfaces that are respectively on the image-plane side and the object side and have the same radius of curvature are cemented together into a triple cemented lens having cemented surfaces R15 and R16 respectively. An incidence surface R14 of the closest lens L8 to the object side is aspherical.

The fifth lens group GR5 is configured with a single lens of a lens L11 having a positive refractive power, and the lens 11 is in the shape of a meniscus lens having a convex surface turned toward the object. The lens L11 is configured such that its surface R19 on the image-plane side is aspherical.

It is noted that a stop IR (a stop surface R11) is placed between the second lens group GR2 and the third lens group GR3, and a filter FL is placed between the fifth lens group GR5 and an image plane (an image capture plane) IMG.

A table 1 shows lens data of the numerical embodiment 1 provided by application of the specific numerical values to the first embodiment of the zoom lens 1A. It is noted that in the table 1 and the subsequent tables indicating the lens data, [Ri] represents the $i^{th}$ surface (an i-numbered surface) counting from the object side and its radius of curvature, [Di] is a surface gap (a lens center thickness or an air gap) between the $i^{th}$ surface counting from the object side and the $i+1^{th}$ surface, [Ni] is a refractive index with respect to a d-line (587.6 nm in wavelength) of a material included in the $i^{th}$ lens, and [vi] an Abbe number with respect to the d-line (587.6 nm in wavelength) of the material included in the $i^{th}$ lens (Li). Further, a surface gap, a refractive index and an Abbe number of the filter which will be described later are respectively denoted as [DFL], [NFL] and [vFL]. Furthermore, with respect to the radius of curvature [Ri], [∞] indicates that a surface concerned is plane, and with respect to the surface gap [Di], [Variable] indicates that a surface gap concerned is variable.

TABLE 1

| | Ri | | Di | | Ni | | vi |
|---|---|---|---|---|---|---|---|
| R1 | 26.175 | D1 | 0.380 | N1 | 1.84666 | v1 | 23.78 |
| R2 | 8.787 | D2 | 1.292 | N2 | 1.69680 | v2 | 55.46 |
| R3 | −75.913 | D3 | 0.057 | | | | |
| R4 | 8.376 | D4 | 0.759 | N3 | 1.80420 | v3 | 46.50 |
| R5 | 24.664 | D5 | Variable | | | | |
| R6 | 24.664 | D6 | 0.163 | N4 | 1.83481 | v4 | 42.72 |
| R7 | 2.562 | D7 | 0.821 | | | | |
| R8 | −3.146 | D8 | 0.171 | N5 | 1.77250 | v5 | 49.62 |
| R9 | 4.377 | D9 | 0.451 | N6 | 1.94595 | v6 | 17.98 |
| R10 | −324.133 | D10 | Variable | | | | |
| R11 | STOP ∞ | D11 | 0.418 | | | | |
| R12 | 3.131 | D12 | 0.989 | N7 | 1.58313 | v7 | 59.46 |
| R13 | 6.769 | D13 | Variable | | | | |
| R14 | 5.035 | D14 | 0.532 | N8 | 1.69350 | v8 | 53.20 |

TABLE 1-continued

|     | Ri       | Di   |          | Ni   |           | vi    |
|-----|----------|------|----------|------|-----------|-------|
| R15 | −7.676   | D15  | 0.171    | N9   | 1.92286 v9  | 20.88 |
| R16 | 19.501   | D16  | 0.533    | N10  | 1.48749 v10 | 70.44 |
| R17 | −3.378   | D17  | Variable |      |           |       |
| R18 | 13.528   | D18  | 0.380    | N11  | 1.52470 v11 | 56.24 |
| R19 | 28.217   | D19  | 1.139    |      |           |       |
| R20 | FILTER ∞ | D20  | 0.535    | N12  | 1.51680 v12 | 64.20 |
| R21 | FILTER ∞ | D21  |          |      |           |       |

A change of a lens position state from the maximum wide-angle state to the maximum telephoto state results in changes of a surface gap D5 between the first lens group GR1 and the second lens group GR2, a surface gap D10 between the second lens group GR2 and the stop IR, a surface gap D13 between the third lens group GR3 and the fourth lens group GR4 and a surface gap D17 between the fourth lens group GR4 and the fifth lens group GR5. Such being the case, a table 2 shows values for each of the surface gaps D5, D10, D13 and D17 at the maximum wide-angle state (f=1.00), the mid-focal length (f=4.84) and the maximum telephoto state (f=23.45) according to the numerical embodiment 1 when the object distance is of infinity. A table 3 shows those when the object distance is of 2 m.

TABLE 2

| | FOCAL LENGTH (AT INFINITY) | | |
|---|---|---|---|
| | 1 | 4.842 | 23.451 |
| D5 | 0.277 | 5.320 | 8.129 |
| D10 | 8.156 | 3.113 | 0.304 |
| D13 | 2.198 | 0.981 | 3.192 |
| D17 | 1.591 | 2.809 | 0.597 |

TABLE 3

| | FOCAL LENGTH (AT 2M) | | |
|---|---|---|---|
| | 1 | 4.842 | 23.451 |
| D5 | 0.277 | 5.320 | 8.129 |
| D10 | 8.156 | 3.113 | 0.304 |
| D13 | 2.197 | 0.947 | 2.459 |
| D17 | 1.593 | 2.843 | 1.330 |

The opposite surfaces R12, R13 of the single lens L7 included in the third lens group GR3, the closest surface R14 to the object side in the fourth lens group GR4, and the image-side surface R19 of the single lens L11 included in the fifth lens group GR5 are aspherical. Such being the case, a table 4 shows the fourth-, sixth-, eighth- and tenth-order aspherical coefficients A4, A6, A8 and A10 of the respective surfaces according to the numerical embodiment 1. It is noted that in the table 4 and the subsequent tables indicating the aspherical coefficients, [E-i] represents an exponential notation to a base ten number, in other words, stands for $[10^{-i}]$, and [0.12345E-05] is expressed as $[0.12345 \times 10^{-5}]$, for instance.

TABLE 4

| | ASPHERICAL COEFFICIENT | | | |
|---|---|---|---|---|
| | A4 | A6 | A8 | A10 |
| R12 | 5.8194E−04 | 8.6594E−04 | −5.5031E−05 | 1.1399E−04 |
| R13 | 5.6839E−03 | 2.9457E−03 | 4.7431E−04 | −6.1093E−05 |
| R14 | −8.3482E−03 | 2.0003E−03 | −7.4153E−04 | 6.3604E−05 |
| R19 | 9.5742E−03 | −2.8906E−02 | 6.0840E−02 | −3.8259E−02 |

A table 5 shows values for the conditional equations (1) to (4) according to the numerical embodiment 1, together with values for the focal length [f] of the overall lens system, the focal length [f4] of the fourth lens group GR4, the focal length [f5] of the fifth lens group GR5, a F-number [FNo.] and an angle of field [2ω].

TABLE 5

| |f4/f5| | 0.09 |
|---|---|
| β5 | 1.0 |
| |MTa/MTs| | 0.6 |
| |(STa − STs)/STa| | 0.4 |
| f | 1.0~23.451 |
| f4 | 4.55 |
| f5 | 48.87 |
| FNo. | 1.9~3.3 |
| 2ω | 65.0°~2.7° |

Figure 2:
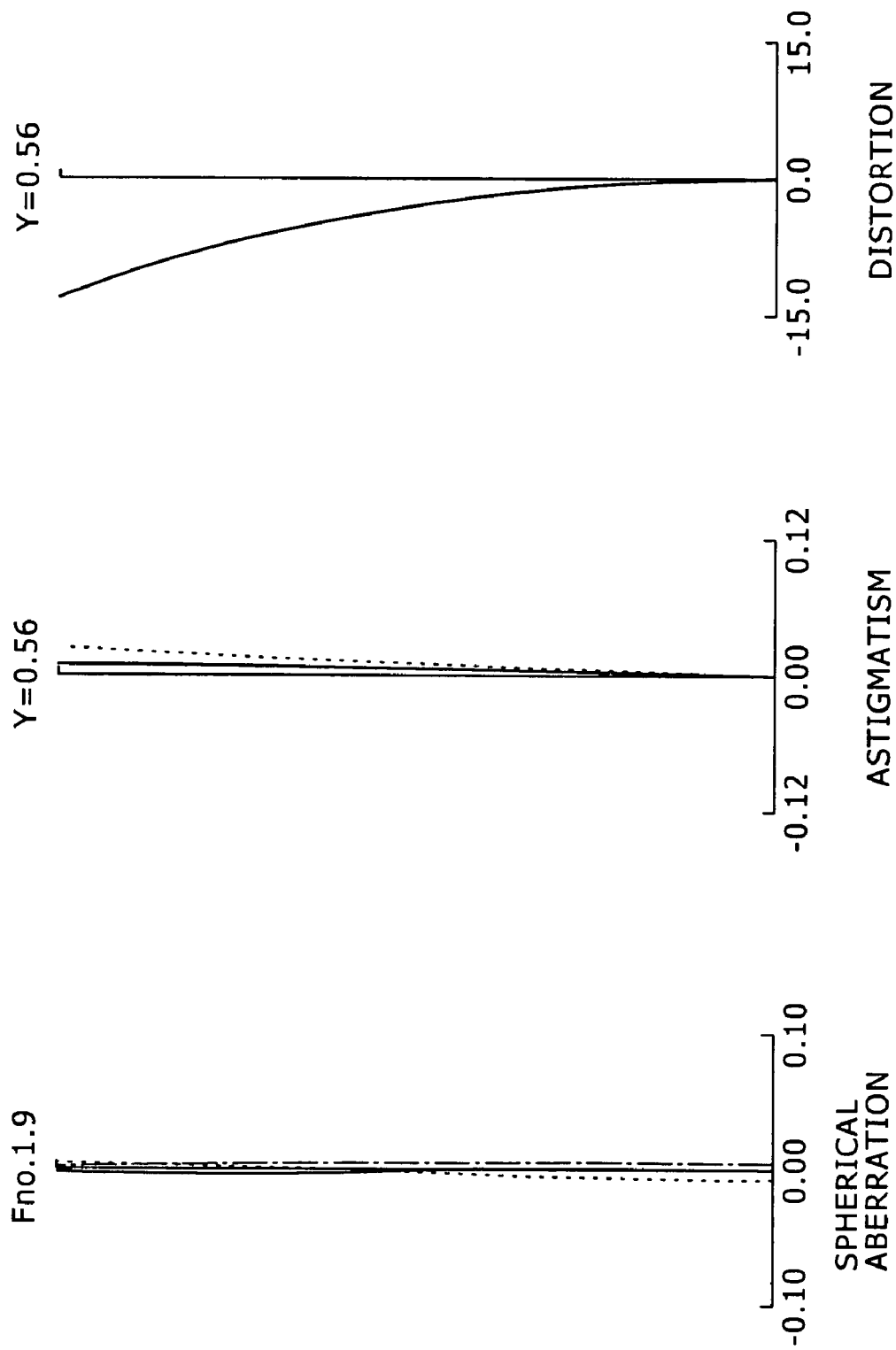
FIG. 2 shows, together with FIGS. 3 and 4, various aberration graphs according to a numerical embodiment 1 provided by application of specific numerical values to the first embodiment of the zoom lens of the present invention when an object distance is of infinity, and the graphs in FIG. 2 illustrate the spherical aberration, astigmatism and distortion at a maximum wide-angle state.
Figure 3:
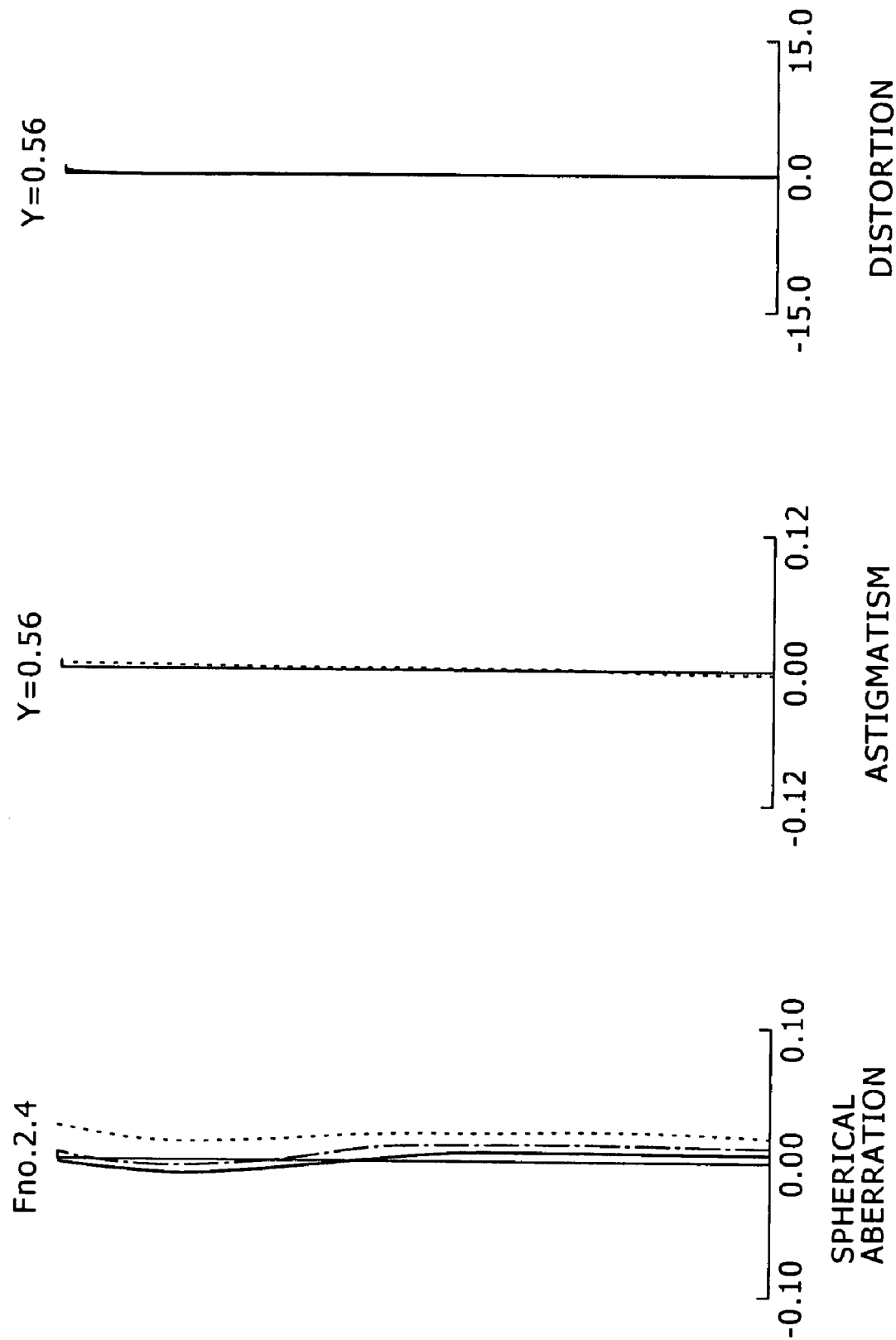
FIG. 3 illustrates the spherical aberration, astigmatism and distortion at a mid-focal length.
Figure 4:
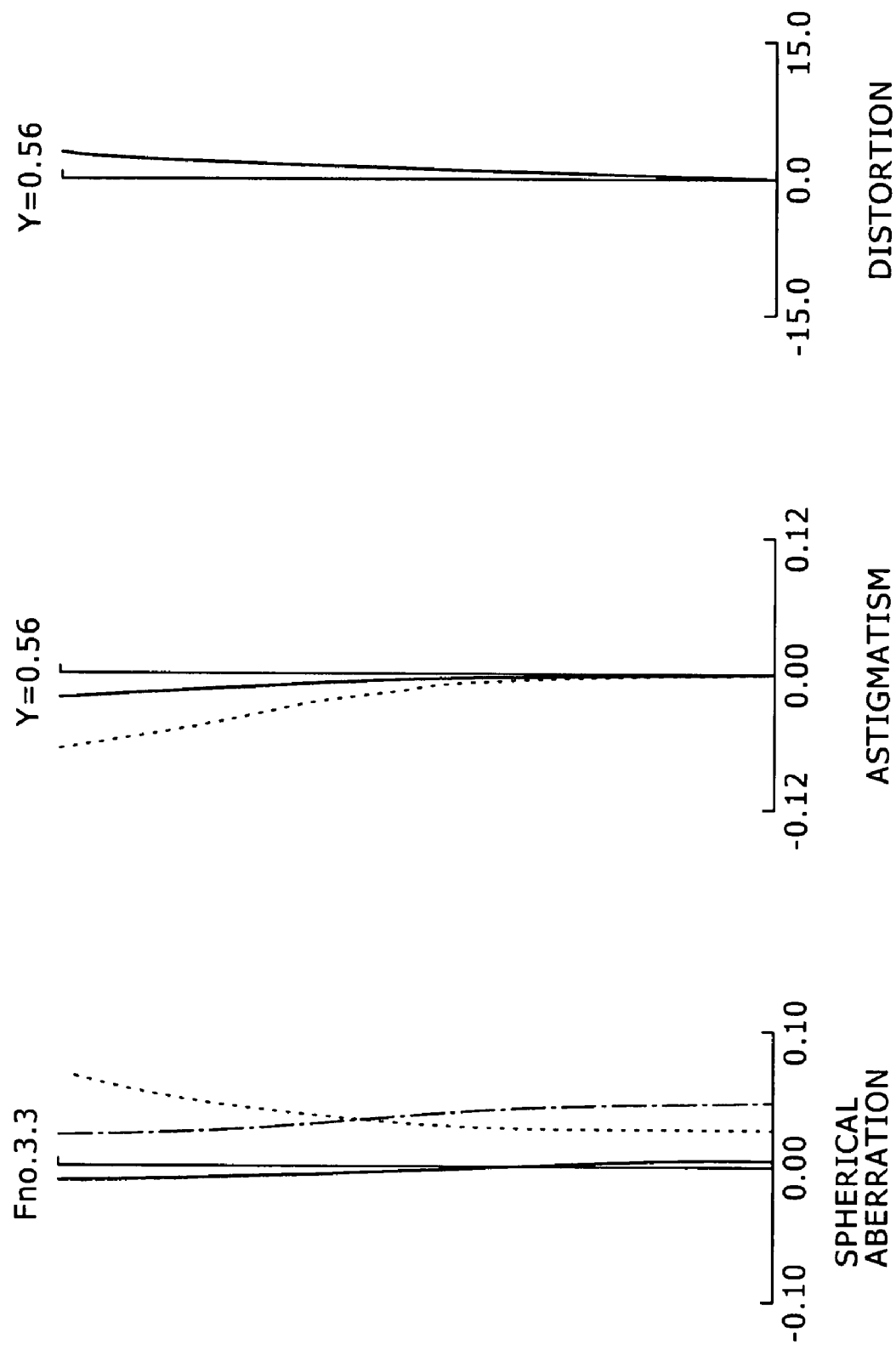
FIG. 4 illustrates the spherical aberration, astigmatism and distortion at a maximum telephoto state.
Figure 5:
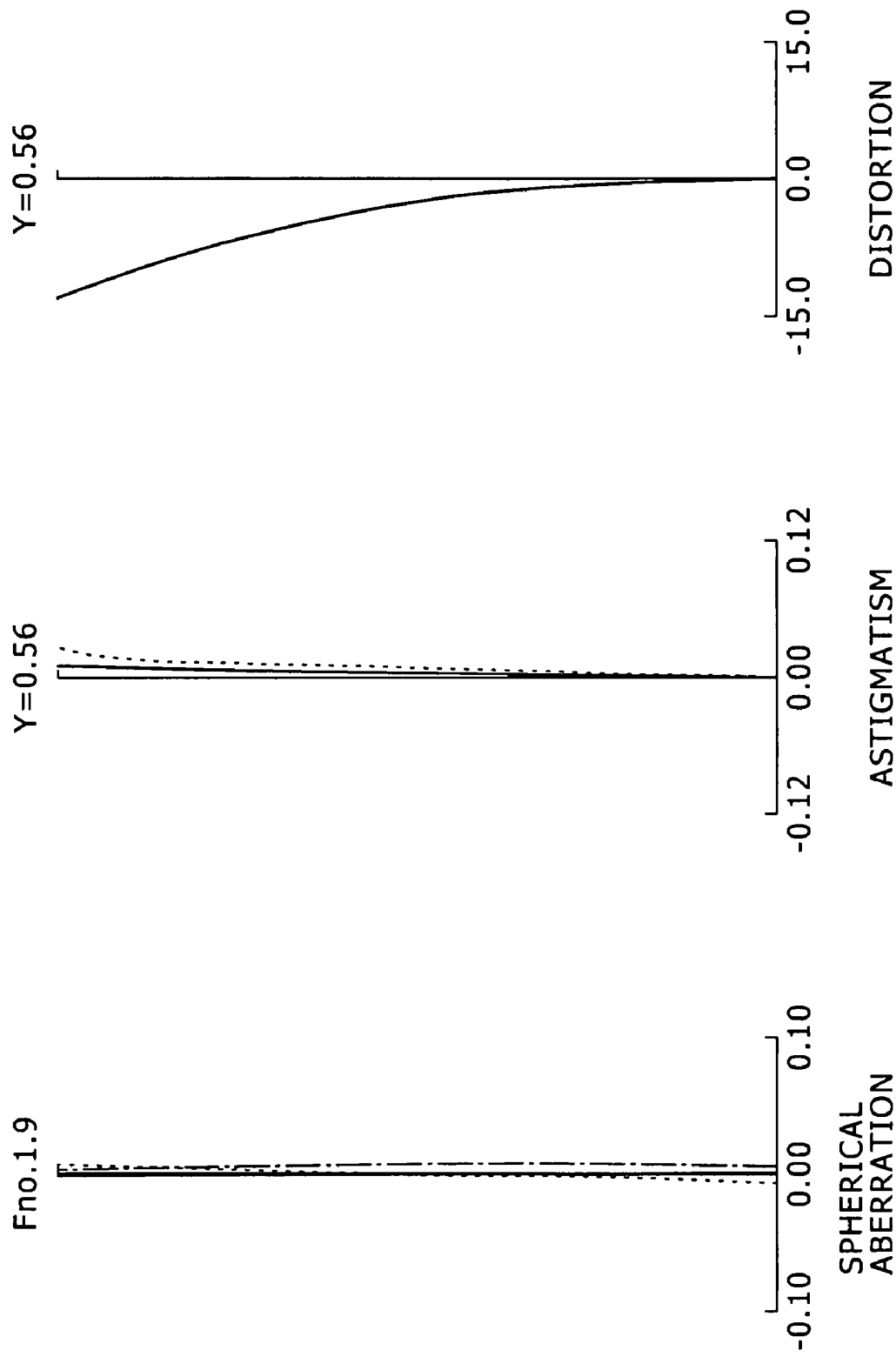
FIG. 5 shows, together with FIGS. 6 and 7, various aberration graphs according to the numerical embodiment 1 provided by application of the specific numerical values to the first embodiment of the zoom lens of the present invention when an object distance is of 2 m, and the graphs in FIG. 5 illustrate the spherical aberration, astigmatism and distortion at a maximum wide-angle state.
Figure 6:
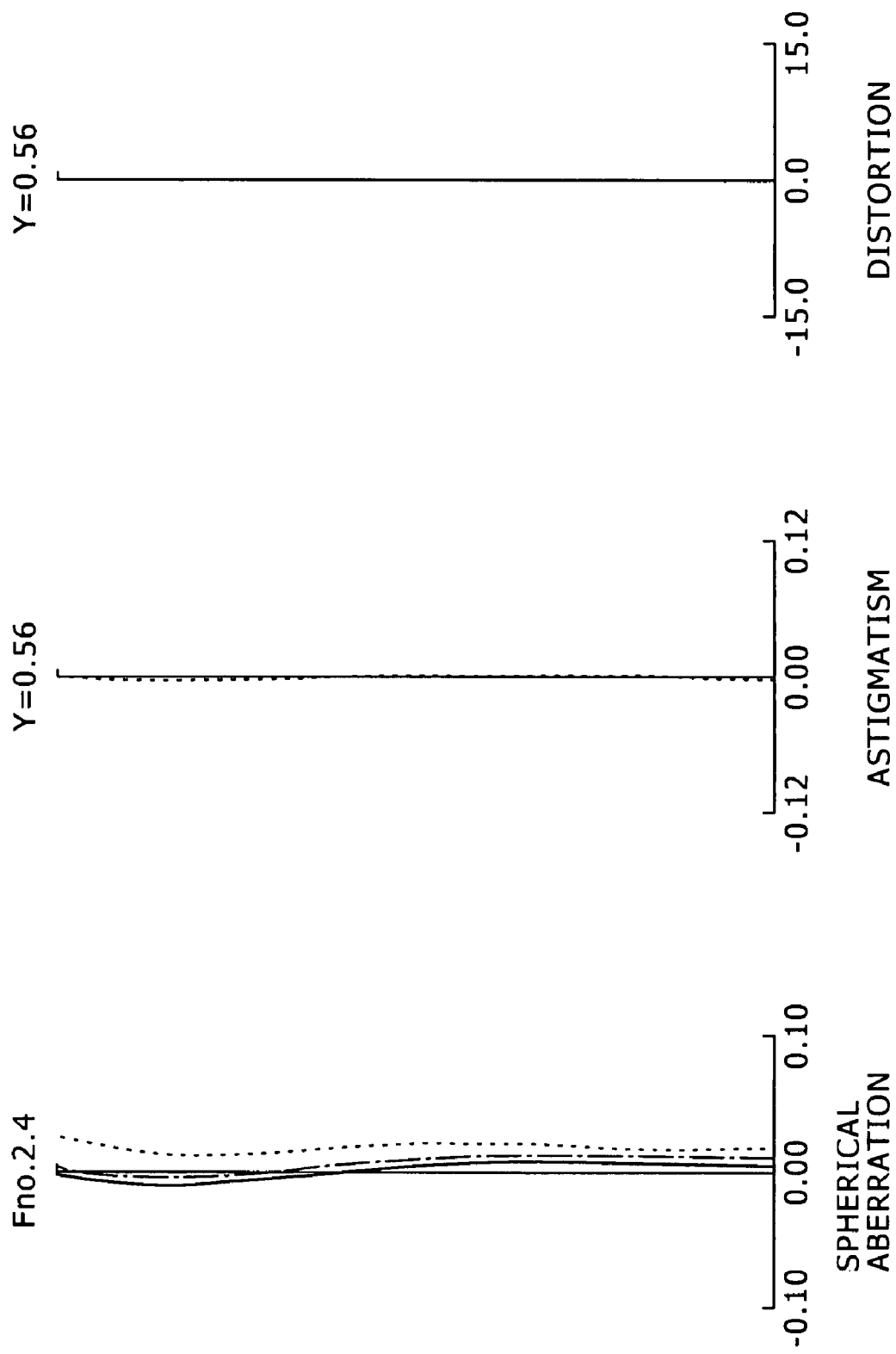
FIG. 6 illustrates the spherical aberration, astigmatism and distortion at a mid-focal length.
Figure 7:
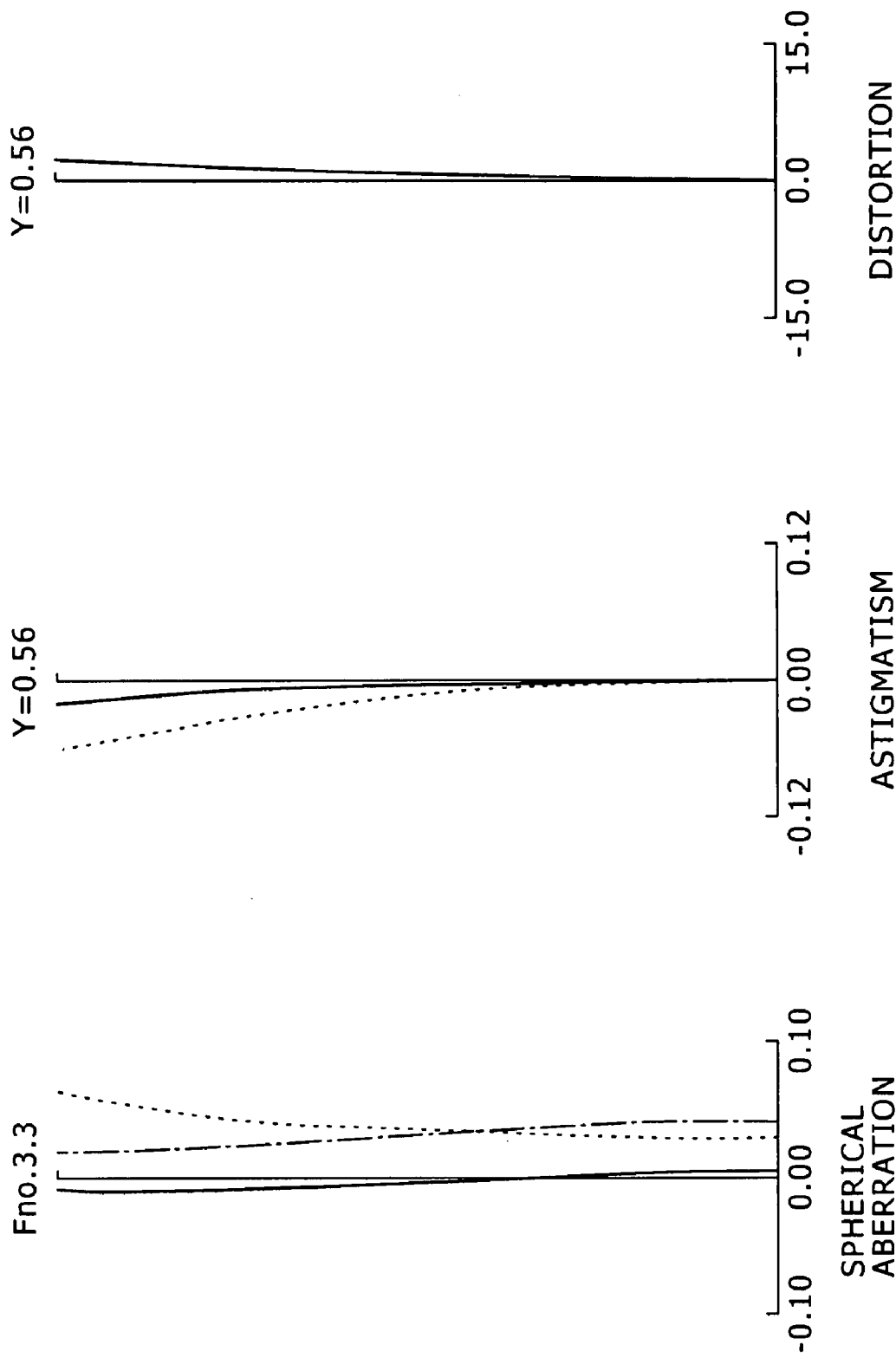
FIG. 7 illustrates the spherical aberration, astigmatism and distortion at a maximum telephoto state.
Figure 8:
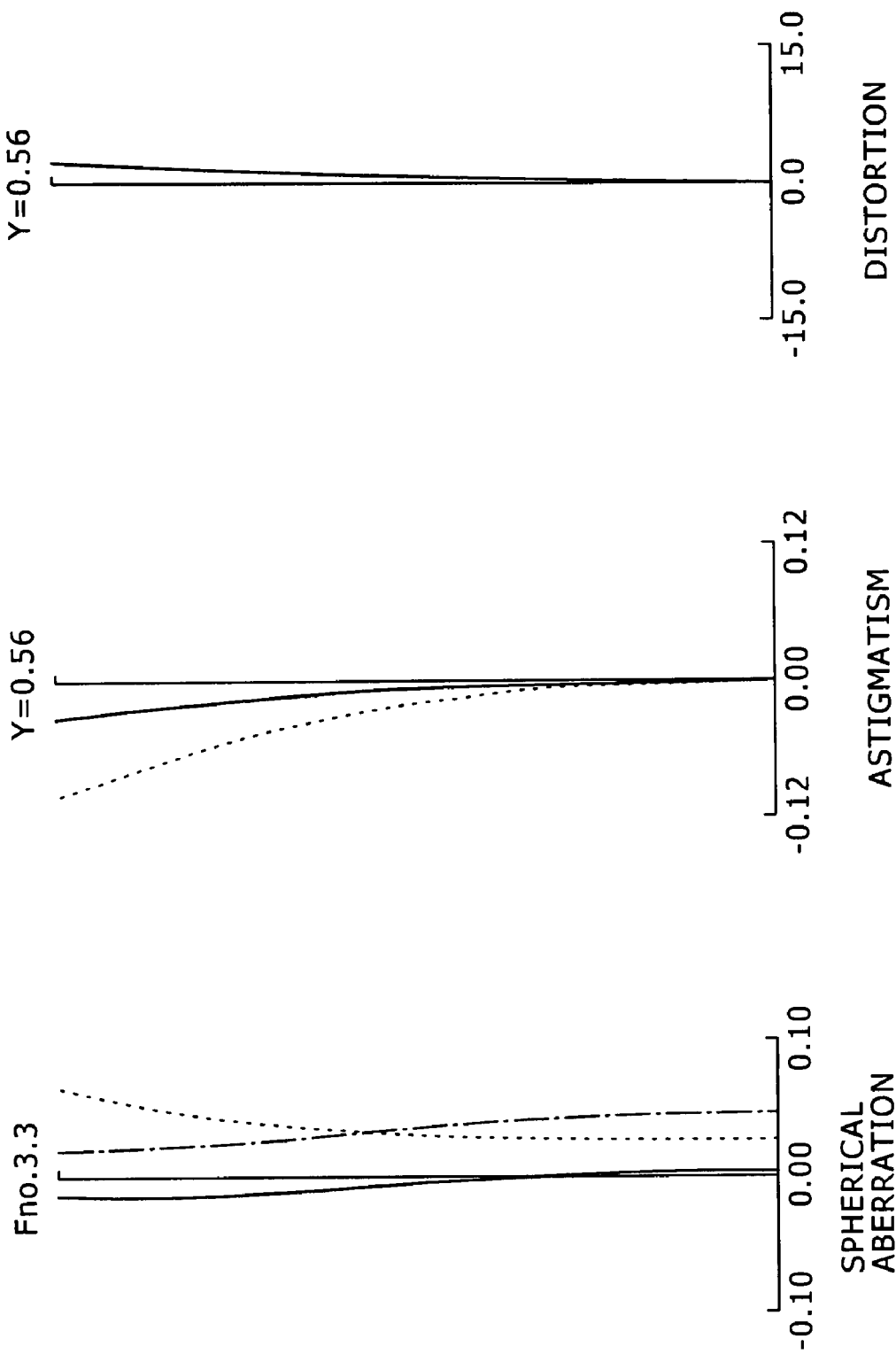
FIG. 8 illustrates the spherical aberration, astigmatism and distortion at a maximum telephoto state according to the numerical embodiment 1 provided by application of the specific numerical values to the first embodiment of the zoom lens of the present invention in a case where an aspherical surface included in a fifth lens group is replaced with a paraxial spherical surface thereof when an object distance is of infinity.

FIGS. 2 to 4 show a spherical aberration graph, an astigmatism graph and a distortion graph for the maximum wide-angle state (f=1.00), the mid-focal length (f=4.48) and the maximum telephoto state (f=23.45) according to the numerical embodiment 1 when the object distance is of infinity. FIGS. 5 to 7 show a spherical aberration graph, an astigmatism graph and a distortion graph for the maximum wide-angle state, the mid-focal length and the maximum telephoto state according to the numerical embodiment 1 when the object distance is of 2 m. FIG. 8 shows a spherical aberration graph, an astigmatism graph and a distortion graph at the maximum telephoto state according to the numerical embodiment 1 when the aspherical surface R19 included in the fifth lens group GR5 is replaced with a paraxial spherical surface thereof when the object distance is of infinity.

It is noted that in the spherical aberration graphs, a solid line indicates values with respect to the d-line, a broken line indicates values with respect to a g-line (435.8 nm in wavelength), and a chain line indicates values with respect to a C-line (656.3 nm in wavelength), respectively. In the astigmatism graphs, a solid line indicates values for a sagittal image plane, and a broken line indicates values for a meridional image plane.

Figure 9:
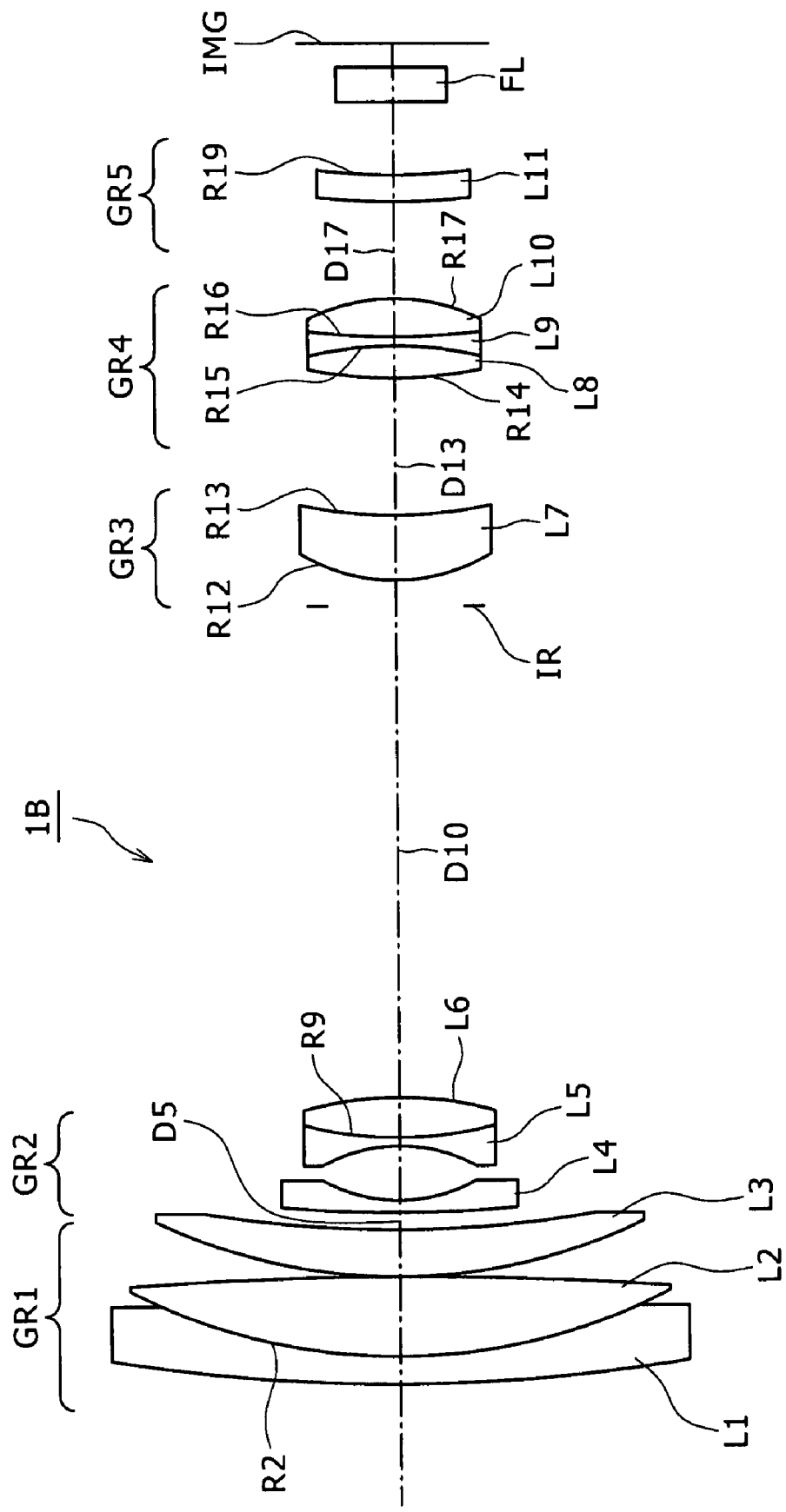
FIG. 9 shows a lens configuration of a second embodiment of the zoom lens according to the present invention.

The zoom lens 1B according to the second embodiment includes eleven lenses in total, as shown in FIG. 9.

The first lens group GR1 has the positive refractive power on the whole, and is configured with three lenses L1, L2 and L3. It is noted that with respect to the lenses L1 and L2, a concave surface and a convex surface that are respectively on the image-plane side of the lens L1 and the object side of the lens L2 and have the same radius of curvature are cemented together into a cemented lens having a cemented surface R2.

The second lens group GR2 has the negative refractive power on the whole, and is configured with three lenses L4, L5 and L6. The second lens group GR2 is movable in position for movement in the direction of the optical axis for providing mainly zooming. It is noted that with respect to the lenses L5 and L6, a concave surface and a convex surface that are respectively on the image-plane side of the lens L5 and the object side of the lens L6 and have the same radius of curvature are cemented together into a cemented lens having a cemented surface R9.

The third lens group GR3 is configured with a single lens of a lens L7 having a positive refractive power, and the lens L7 is in the shape of a meniscus lens having a convex surface turned toward the object. The lens L7 is configured such that its opposite surfaces R12 and R13 are both aspherical.

The fourth lens group GR4 has the positive refractive power on the whole, and is configured with three lenses L8, L9 and L10. The fourth lens group GR4 is movable in position for movement in the direction of the optical axis for performing a focal position correction due to the zooming and for focusing. It is noted that with respect to the lenses L8, L9 and L10, their surfaces that are respectively on the image-plane side and the object side and have the same radius of curvature are cemented together into a triple cemented lens having cemented surfaces R15 and R16, respectively. An incidence surface R14 of the closest lens L8 to the object side and an exit surface R17 of the closest lens L10 to the image-plane side are both aspherical.

The fifth lens group GR5 is configured with a single lens of a lens L11 having a positive refractive power, and the lens L11 is in the shape of a meniscus lens having a convex surface turned toward the object. The lens L11 is configured such that its surface R19 on the image-plane side is aspherical.

It is noted that a stop IR (a stop surface R11) is placed between the second lens group GR2 and the third lens group GR3, and a filter FL is placed between the fifth lens group GR5 and the image plane (the image capture plane) IMG.

A table 6 shows lens data according to a numerical embodiment 2 provided by application of specific numerical values to the second embodiment of the zoom lens 1B.

TABLE 6

|  | Ri | Di | | Ni | νi |
|---|---|---|---|---|---|
| R1 | 25.681 | D1 | 0.384 | N1 1.84666 | ν1 23.78 |
| R2 | 8.968 | D2 | 1.295 | N2 1.69680 | ν2 55.46 |
| R3 | −76.806 | D3 | 0.058 | | |
| R4 | 8.277 | D4 | 0.768 | N3 1.80420 | ν3 46.50 |
| R5 | 23.057 | D5 | Variable | | |
| R6 | 23.057 | D6 | 0.165 | N4 1.90366 | ν4 31.32 |
| R7 | 2.510 | D7 | 0.837 | | |
| R8 | −2.898 | D8 | 0.173 | N5 1.80420 | ν5 46.50 |
| R9 | 4.398 | D9 | 0.539 | N6 1.94595 | ν6 17.98 |
| R10 | −14.884 | D10 | Variable | | |
| R11 | STOP ∞ | D11 | 0.422 | | |
| R12 | 3.159 | D12 | 1.075 | N7 1.58313 | ν7 59.46 |
| R13 | 6.679 | D13 | Variable | | |
| R14 | 4.036 | D14 | 0.588 | N8 1.69350 | ν8 53.20 |
| R15 | −10.484 | D15 | 0.173 | N9 1.92286 | ν9 20.88 |
| R16 | 10.504 | D16 | 0.493 | N10 1.48749 | ν10 70.44 |
| R17 | −4.017 | D17 | Variable | | |
| R18 | 89.642 | D18 | 0.384 | N11 1.52470 | ν11 56.24 |
| R19 | −36.902 | D19 | 1.152 | | |
| R20 | FILTER ∞ | D20 | 0.655 | N12 1.51680 | ν12 64.20 |
| R21 | FILTER ∞ | D21 | | | |

A change of the lens position state from the maximum wide-angle state to the maximum telephoto state results in changes of a surface gap D5 between the first lens group GR1 and the second lens group GR2, a surface gap D10 between the second lens group GR2 and the stop IR, a surface gap D13 between the third lens group GR3 and the fourth lens group GR4, and a surface gap D17 between the fourth lens group GR4 and the fifth lens group GR5. Such being the case, a table 7 shows values for each of the surface gaps D5, D10, D13 and D17 for the wide angle (f=1.00), the mid-focal length (f=4.84) and the maximum telephoto state (f=23.42) according to the numerical embodiment 2 when the object distance is of infinity. A table 8 shows those when the object distance is of 2 m.

TABLE 7

| FOCAL LENGTH (AT INFINITY) | | | |
|---|---|---|---|
| | 1 | 4.840 | 23.424 |
| D5 | 0.280 | 5.386 | 8.173 |
| D10 | 8.200 | 3.094 | 0.307 |
| D13 | 2.236 | 1.066 | 3.247 |
| D17 | 1.479 | 2.648 | 0.468 |

TABLE 8

| FOCAL LENGTH (AT 2M) | | | |
|---|---|---|---|
| | 1 | 4.840 | 23.424 |
| D5 | 0.280 | 5.386 | 8.173 |
| D10 | 8.200 | 3.094 | 0.307 |
| D13 | 2.234 | 1.034 | 2.538 |
| D17 | 1.481 | 2.681 | 1.177 |

The opposite surfaces R12, R13 of the single lens L7 included in the third lens group GR3, the closest surface R14 to the object side and the closest surface R17 to the image side in the fourth lens group GR4, and the image-side surface R19 of the single lens L11 included in the fifth lens group GR5 are aspherical. Such being the case, a table 9 shows the fourth-, sixth-, eighth-, and tenth-order aspherical coefficients A4, A6, A8 and A10 of the respective surfaces according to the numerical embodiment 2.

TABLE 9

| ASPHERICAL COEFFICIENT | | | | |
|---|---|---|---|---|
| | A4 | A6 | A8 | A10 |
| R12 | −2.0857E−03 | 1.7016E−03 | −4.7916E−04 | 1.6591E−04 |
| R13 | 1.8399E−03 | 3.8861E−03 | −9.9923E−06 | −5.5551E−05 |
| R14 | −4.2215E−03 | 2.4951E−03 | 3.6388E−04 | −2.6067E−04 |
| R17 | 5.8959E−03 | 3.3725E−03 | −5.9961E−04 | 0.0000E+00 |
| R19 | 5.7963E−03 | −1.9743E−02 | 4.3171E−02 | −2.4693E−02 |

A table 10 shows values for the conditional equations (1) to (4) according to the numerical embodiment 2, together with values for the focal length [f] of the overall lens system, the focal length [f4] of the fourth lens group GR4, the focal length [f5] of the fifth lens group GR5, the F-number [Fno], and the field of angle [2ω].

TABLE 10

| |f4/f5| | 0.09 |
|---|---|
| β5 | 1.0 |
| |MTa/MTs| | 0.6 |
| |(STa − STs)/STa| | 0.2 |
| f | 1.0~23.424 |
| f4 | 4.54 |
| f5 | 49.66 |
| FNo. | 1.9~3.3 |
| 2ω | 66.2°~2.7° |

Figure 10:
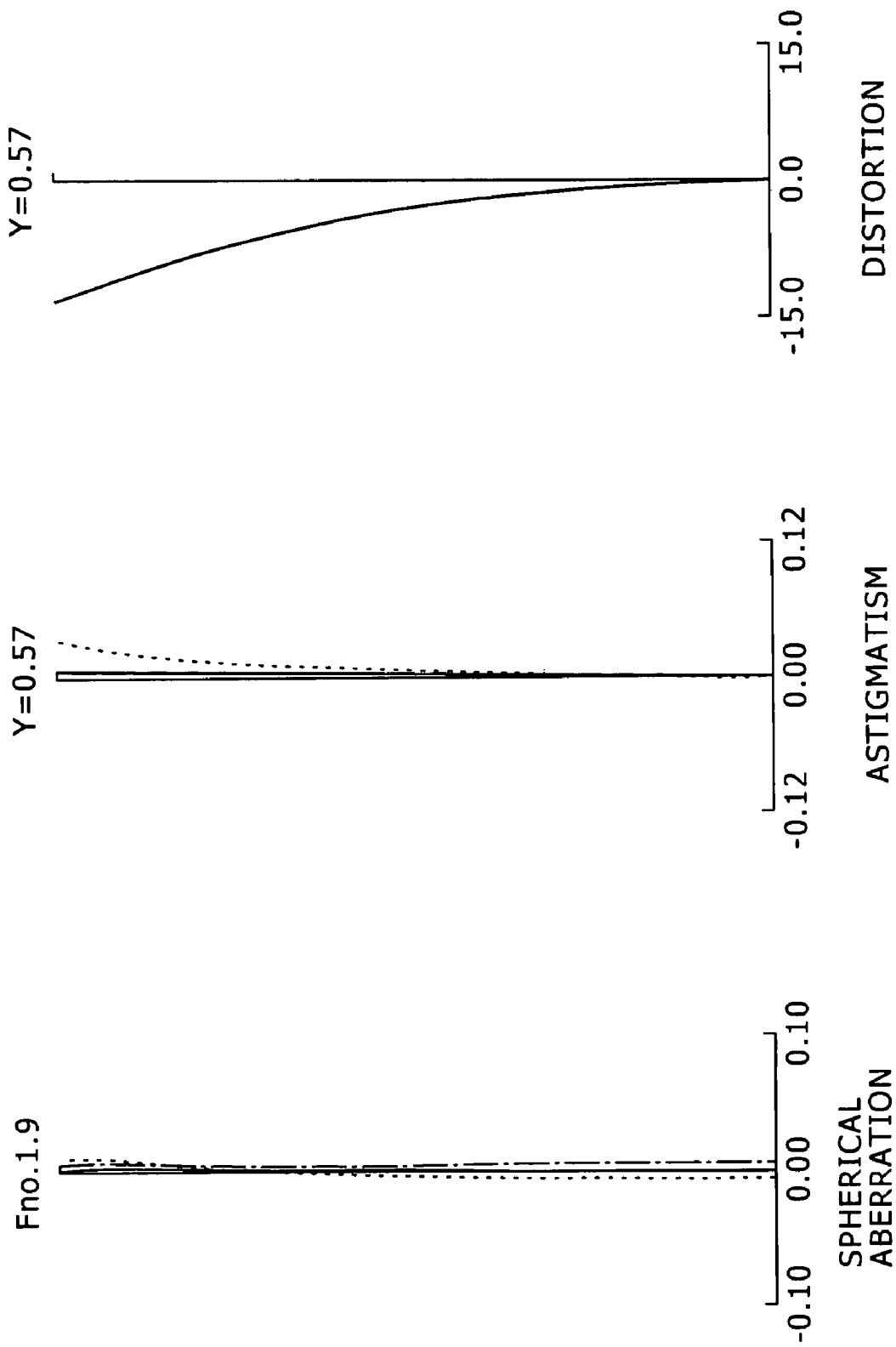
FIG. 10 shows, together with FIGS. 11 and 12, various aberration graphs according to a numerical embodiment 2 provided by application of specific numerical values to the second embodiment of the zoom lens of the present invention when an object distance is of infinity, and the graphs in FIG. 10 illustrate the spherical aberration, astigmatism and distortion for a maximum wide-angle state.
Figure 11:
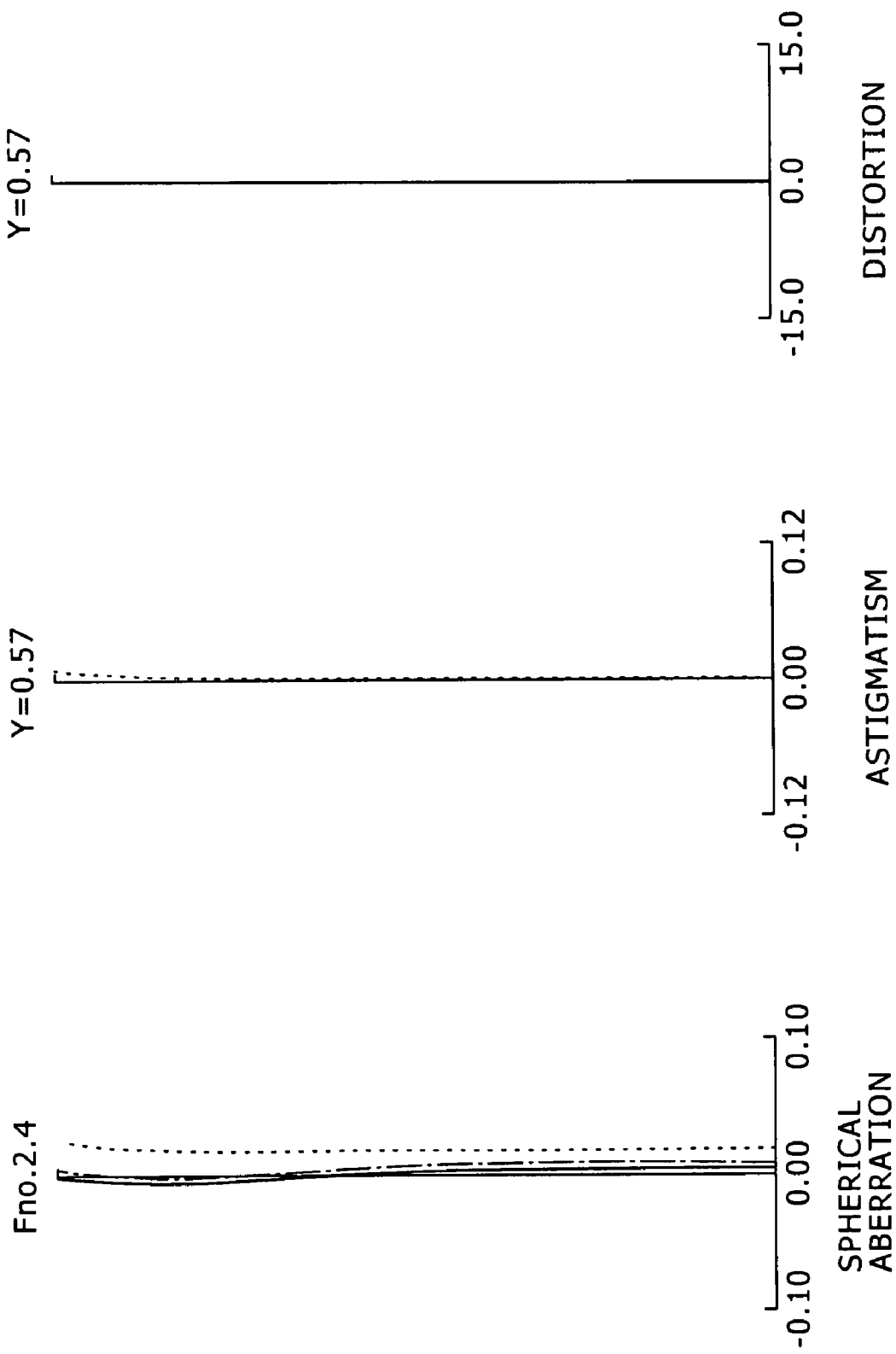
FIG. 11 illustrates the spherical aberration, astigmatism and distortion for a mid-focal length.
Figure 12:
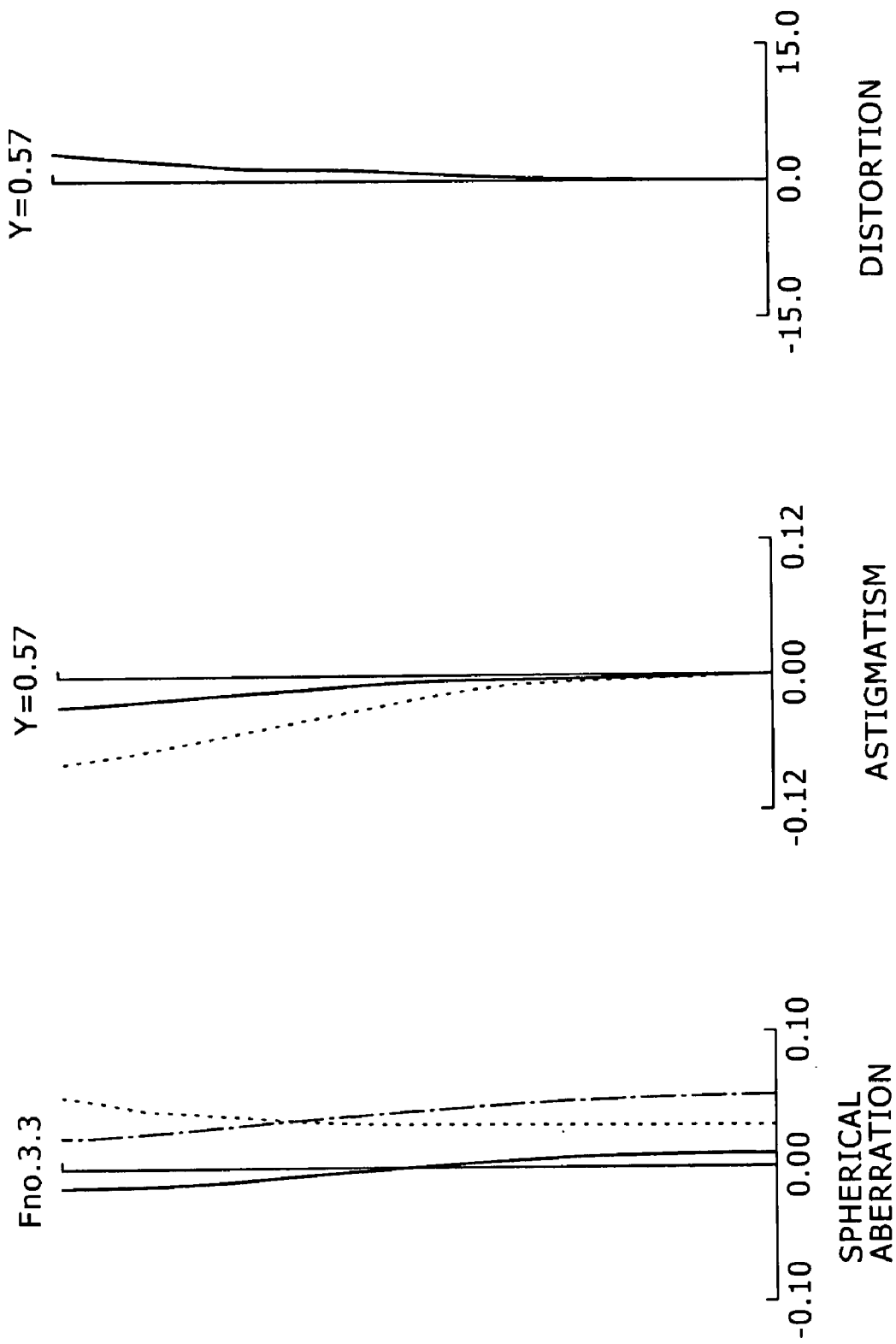
FIG. 12 illustrates the spherical aberration, astigmatism and distortion for a maximum telephoto state.
Figure 13:
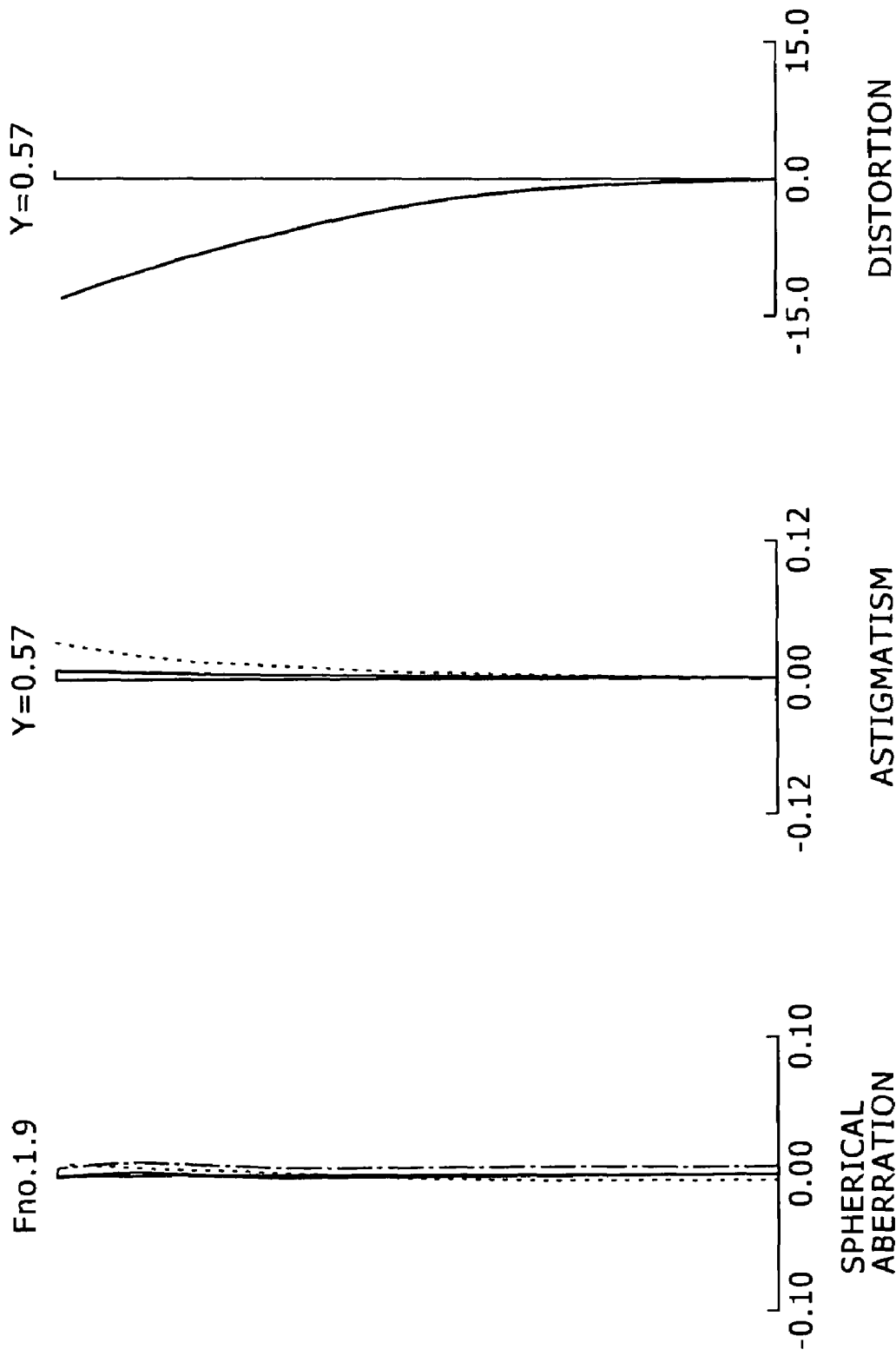
FIG. 13 shows, together with FIGS. 14 and 15, various aberration graphs according to the numeral embodiment 2 provided by application of the specific numerical values to the second embodiment of the zoom lens of the present invention when an object distance is of 2 m, and the graphs in FIG. 13 illustrate the spherical aberration, astigmatism and distortion for a maximum wide-angle state.
Figure 14:
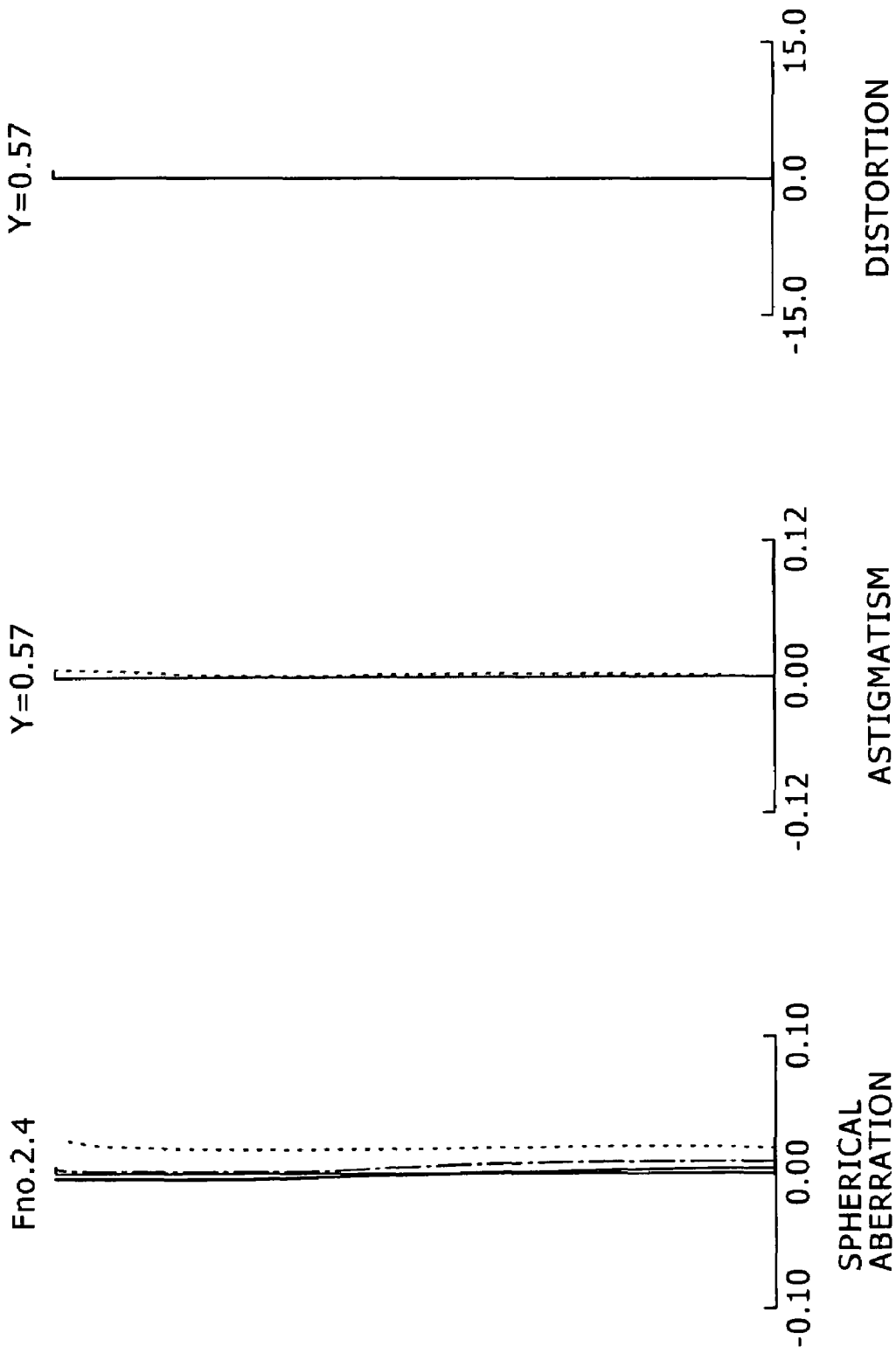
FIG. 14 illustrates the spherical aberration, astigmatism and distortion for a mid-focal length.
Figure 15:
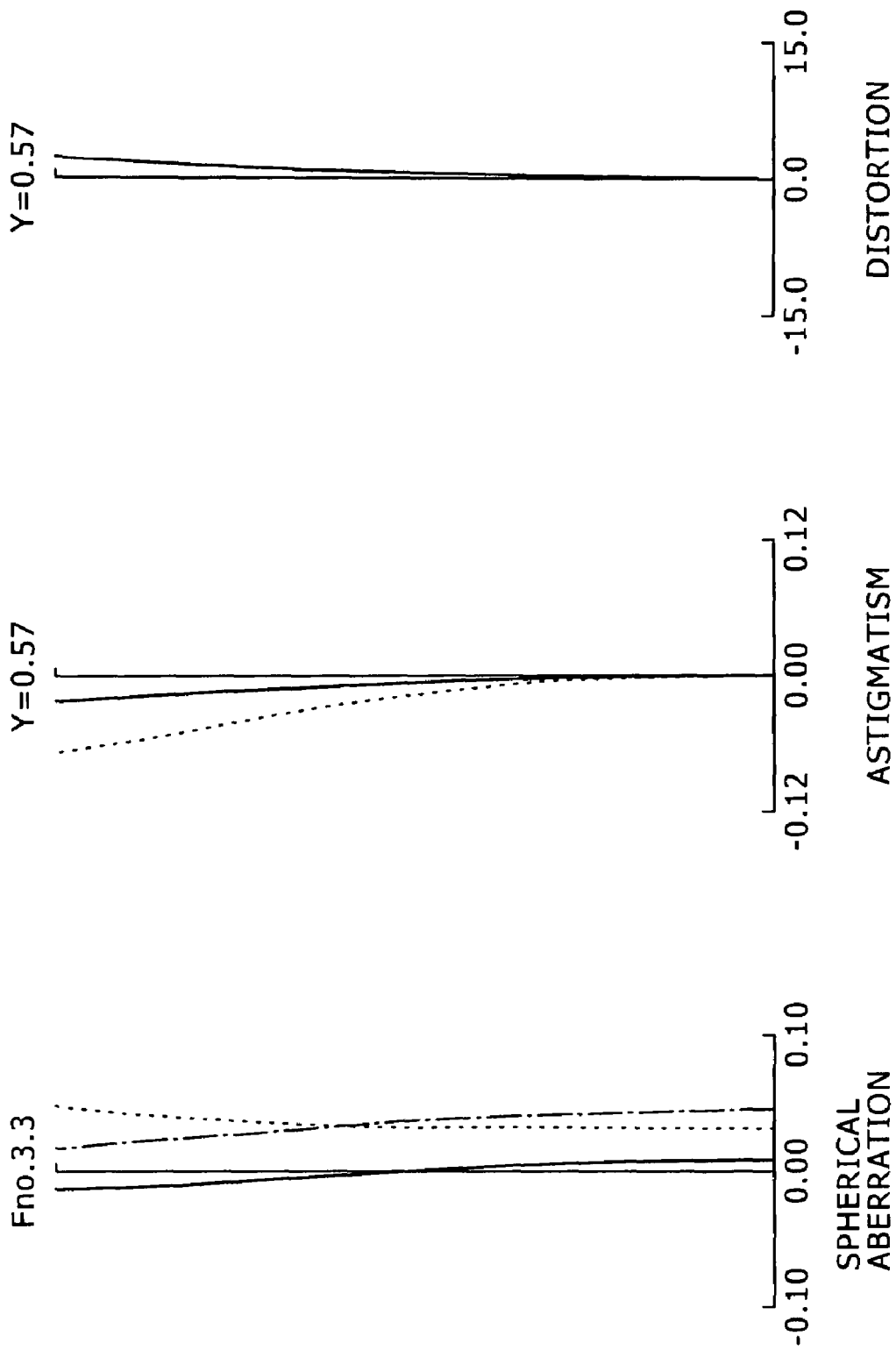
FIG. 15 illustrates the spherical aberration, astigmatism and distortion for a maximum telephoto state.
Figure 16:
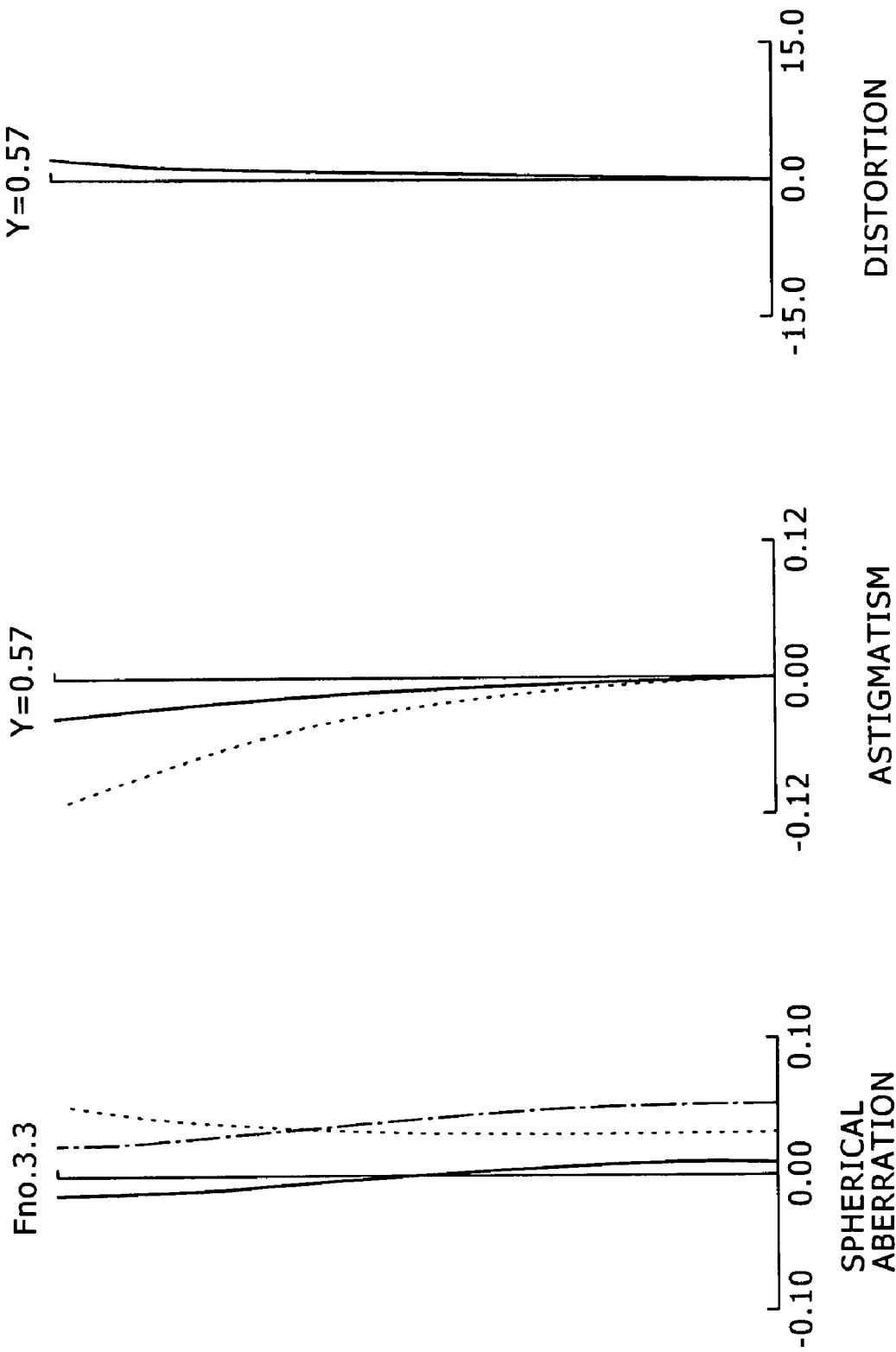
FIG. 16 illustrates the spherical aberration, astigmatism and distortion at a maximum telephoto state according to the numerical embodiment 2 provided by application of the specific numerical values to the second embodiment of the zoom lens of the present invention in a case where an aspherical surface included in the fifth lens group is replaced with a paraxial spherical surface thereof when an object distance is of infinity.

FIGS. 10 to 12 are a spherical aberration graph, an astigmatism graph, and a distortion graph for the maximum wide-angle state (f=1.00), the mid-focal length (f=4.84) and the maximum telephoto state (f=23.42) according to the numerical embodiment 2 when the object distance is of infinity. FIGS. 13 to 15 show a spherical aberration graph, an astigmatism graph and a distortion graph for the maximum wide-angle state, the mid-focal length and the maximum telephoto state according to the numerical embodiment 2 when the object distance is of 2 m. FIG. 16 shows a spherical aberration graph, an astigmatism graph and a distortion graph at the maximum telephoto state according to the numerical embodiment 2 when the aspherical surface R19 included in the fifth lens group GR5 is replaced with a paraxial spherical surface thereof when the object distance is of infinity.

It is noted that in the spherical aberration graphs, a solid line indicates values with respect to the d-line, a broken line indicates values with respect to the g-line (435.8 nm in wavelength), and a chain line indicates values with respect to the C-line (656.3 nm in wavelength). In the astigmatism graphs, a solid line indicates values with respect to the sagittal image plane, and a broken line indicates values with respect to the meridional image plane.

Figure 17:
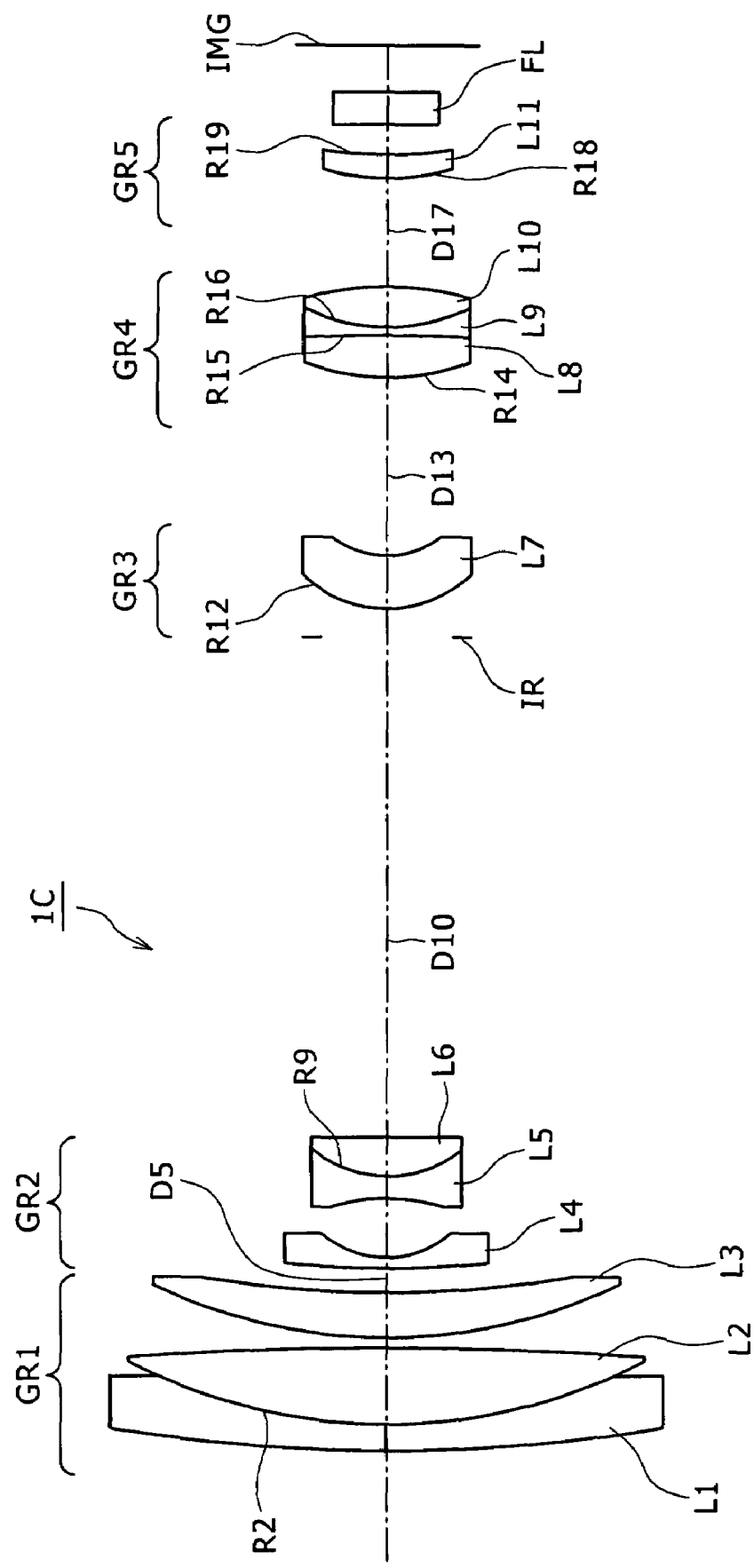
FIG. 17 shows a lens configuration of a third embodiment of the zoom lens according to the present invention.

The zoom lens 1C according to the third embodiment includes eleven lenses in total, as shown in FIG. 17.

The first lens group GR1 has the positive refractive power on the whole, and is configured with three lenses L1, L2 and L3. It is noted that with respect to the lenses L1 and L2, a concave surface and a convex surface that are respectively on the image-plane side of the lens L1 and the object side of the lens L2 and have the same radius of curvature are cemented together into a cemented lens having a cemented surface R2.

The second lens group GR2 has the negative refractive power on the whole, and is configured with three lenses L4, L5 and L6. The second lens group GR2 is movable in position for movement in the direction of the optical axis for providing mainly zooming. It is noted that with respect to the lenses L5 and L6, a concave surface and a convex surface that are respectively on the image-plane side of the lens L5 and the object side of the lens L6 and have the same radius of curvature are cemented together into a cemented lens having a cemented surface R9.

The third lens group GR3 is configured with a single lens of a lens L7 having a positive refractive power, and the lens L7 is in the shape of a meniscus lens having a convex surface turned toward the object. The lens L7 is configured such that its surface R12 on the object side is aspherical.

The fourth lens group has the positive refractive power on the whole, and is configured with three lenses L8, L9 and L10. The fourth lens group GR4 is movable in position for movement in the direction of the optical axis for performing a focal position correction due to the zooming and for focusing. It is noted that with respect to the lenses L8, L9 and L10, their surfaces that are respectively on the image-plane side and the object side and have the same radius of curvature are cemented together into a triple cemented lens having cemented surfaces R15 and R16 respectively. An incidence surface R14 of the closest lens L8 to the object side is aspherical.

The fifth lens group GR5 is configured with a single lens of a lens L11 having a positive refractive power, and the lens L11 is in the shape of a meniscus lens having a convex surface turned toward the object. The lens L11 is configured such that its opposite surfaces R18 and R19 are both aspherical.

It is noted that a stop IR (a stop surface R11) is placed between the second lens group GR2 and the third lens group GR3, and a filter FL is placed between the fifth lens group GR5 and the image plane (the image capture plane) IMG.

A table 11 shows lens data according to a numerical embodiment 3 provided by application of specific numerical values to the third embodiment of the zoom lens 1C.

TABLE 11

| | Ri | | Di | Ni | vi |
|---|---|---|---|---|---|
| R1 | 23.976 | D1 | 0.513 | N1 1.84666 | v1 23.78 |
| R2 | 11.816 | D2 | 2.057 | N2 1.48749 | v2 70.44 |
| R3 | −49.732 | D3 | 0.077 | | |
| R4 | 10.807 | D4 | 1.155 | N3 1.77250 | v3 49.62 |
| R5 | 34.265 | D5 | Variable | | |
| R6 | 15.823 | D6 | 0.231 | N4 1.83400 | v4 37.34 |
| R7 | 2.455 | D7 | 1.476 | | |
| R8 | −3.933 | D8 | 0.501 | N5 1.69680 | v5 55.46 |
| R9 | 3.134 | D9 | 0.814 | N6 1.84666 | v6 23.78 |
| R10 | ∞ | D10 | Variable | | |
| R11 | STOP ∞ | D11 | 0.564 | | |
| R12 | 2.559 | D12 | 1.282 | N7 1.52470 | v7 56.24 |
| R13 | 2.635 | D13 | Variable | | |
| R14 | 4.321 | D14 | 0.941 | N8 1.58313 | v8 59.46 |
| R15 | ∞ | D15 | 0.231 | N9 1.84666 | v9 23.78 |
| R16 | 4.944 | D16 | 0.884 | N10 1.69680 | v10 55.46 |
| R17 | −6.198 | D17 | Variable | | |
| R18 | 7.679 | D18 | 0.513 | N11 1.52470 | v11 56.24 |
| R19 | 7.504 | D19 | 0.513 | | |
| R20 | FILTER ∞ | D20 | 0.798 | N12 1.51680 | v12 64.20 |
| R21 | FILTER ∞ | D21 | | | |

A change of the lens position state from the maximum wide-angle state to the maximum telephoto state results in changes of a surface gap D5 between the first lens group GR1 and the second lens group GR2, a surface gap D10 between the second lens group GR2 and the stop IR, a surface gap D13 between the third lens group GR3 and the fourth lens group GR4, and a surface gap D17 between the fourth lens group GR4 and the fifth lens group GR5. Such being the case, a table 12 shows values for each of the surface gaps D5, D10, D13 and D17 with respect to the maximum wide-angle state (f=1.00), the mid-focal length (f=6.30) and the maximum telephoto state (f=39.74) according to the numerical embodiment 3 when the object distance is of infinity. A table 13 shows those when the object distance is of 2 m.

TABLE 12

| | FOCAL LENGTH (AT INFINITY) | | |
|---|---|---|---|
| | 1 | 6.304 | 39.743 |
| D5 | 0.436 | 8.208 | 11.673 |
| D10 | 11.750 | 3.978 | 0.513 |
| D13 | 4.028 | 2.298 | 5.606 |
| D17 | 2.459 | 4.189 | 0.881 |

TABLE 13

| | FOCAL LENGTH (AT 2M) | | |
|---|---|---|---|
| | 1 | 6.304 | 39.743 |
| D5 | 0.436 | 8.208 | 11.673 |
| D10 | 11.750 | 3.978 | 0.513 |
| D13 | 4.027 | 2.244 | 4.382 |
| D17 | 2.460 | 4.243 | 2.105 |

The object-side surface R12 of the single lens L7 included in the third lens group GR3, the closest surface R14 to the object side in the fourth lens group GR4 and the opposite surfaces R18, R19 of the single lens L11 included in the fifth lens group are aspherical. Such being the case, a table 14 shows the fourth-, sixth-, eighth-, and tenth-degree aspherical coefficients A4, A6, A8 and A10 of the respective surfaces according to the numerical embodiment 3.

TABLE 14

ASPHERICAL COEFFICIENT

| | A4 | A6 | A8 | A10 |
|---|---|---|---|---|
| R12 | −3.2982E−03 | −3.4556E−04 | −9.8240E−05 | 4.9579E−06 |
| R14 | −3.7751E−03 | −3.6154E−04 | 1.7272E−04 | −3.0961E−05 |
| R18 | −2.3657E−02 | 5.8940E−02 | −4.2408E−02 | 1.0809E−02 |
| R19 | −3.3722E−02 | 9.9116E−02 | −8.2600E−02 | 2.4644E−02 |

A table 15 shows values for the conditional equations (1) to (4), together with values for the focal length [f] of the overall lens system, the focal length [f4] of the fourth lens group GR4, the focal length [f5] of the fifth lens group GR5, the F-number [FNo.] and the angle of field [2ω].

TABLE 15

| |f4/f5| | 0.00 |
|---|---|
| β5 | 1.0 |
| |MTa/MTs| | 1.0 |
| |(STa − STs)/STa| | 0.9 |
| f | 1.0~39.743 |
| f4 | 4.93 |
| f5 | 61372.13 |
| FNo. | 1.9~4.0 |
| 2ω | 65.0°~2.7° |

Figure 18:
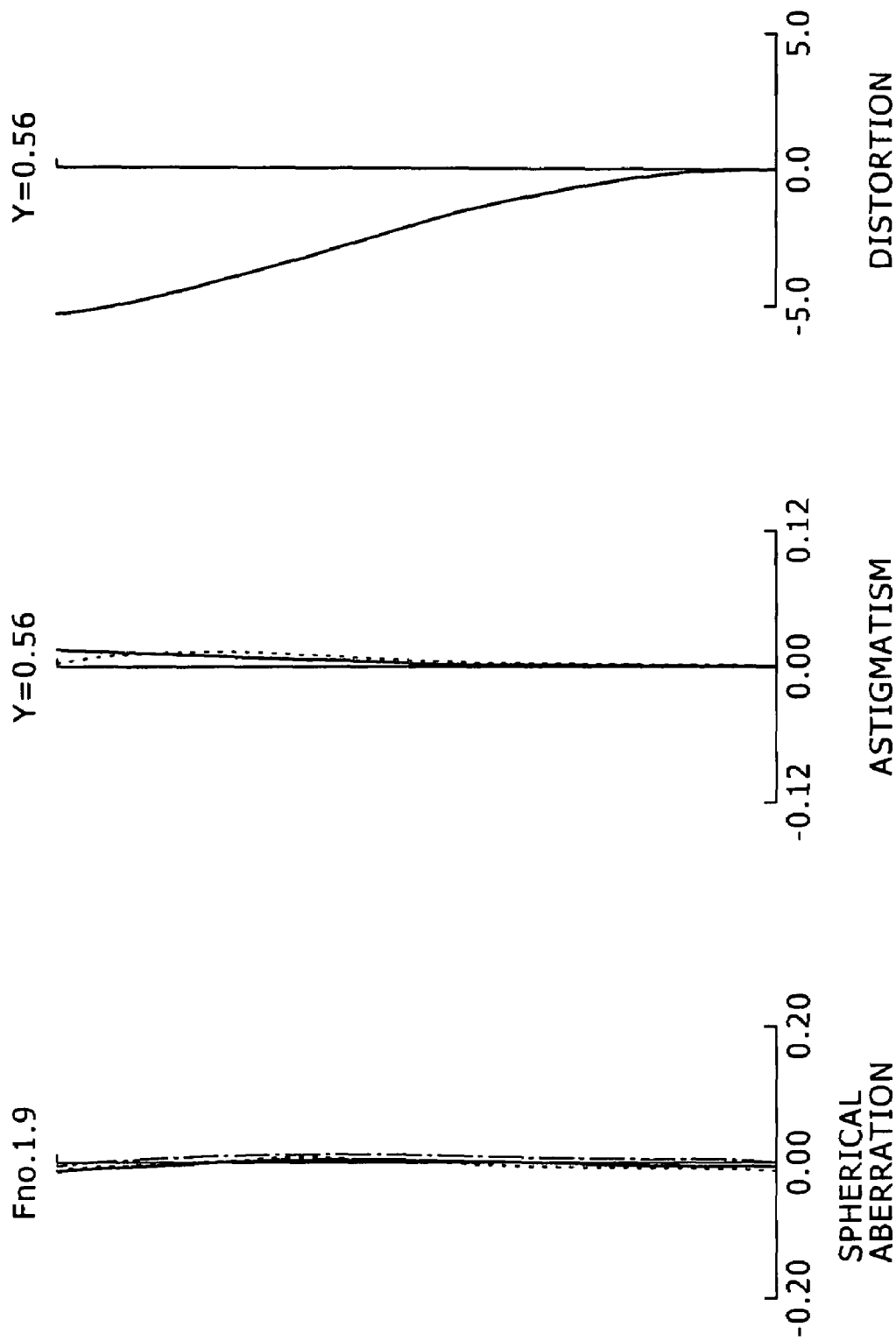
FIG. 18 shows, together with FIGS. 19 and 20, various aberration graphs according to a numerical embodiment 3 provided by application of specific numerical values to the third embodiment of the zoom lens of the present invention when an object distance is of infinity, and the graphs in FIG. 18 illustrate the spherical aberration, astigmatism and distortion for a maximum wide-angle state.
Figure 19:
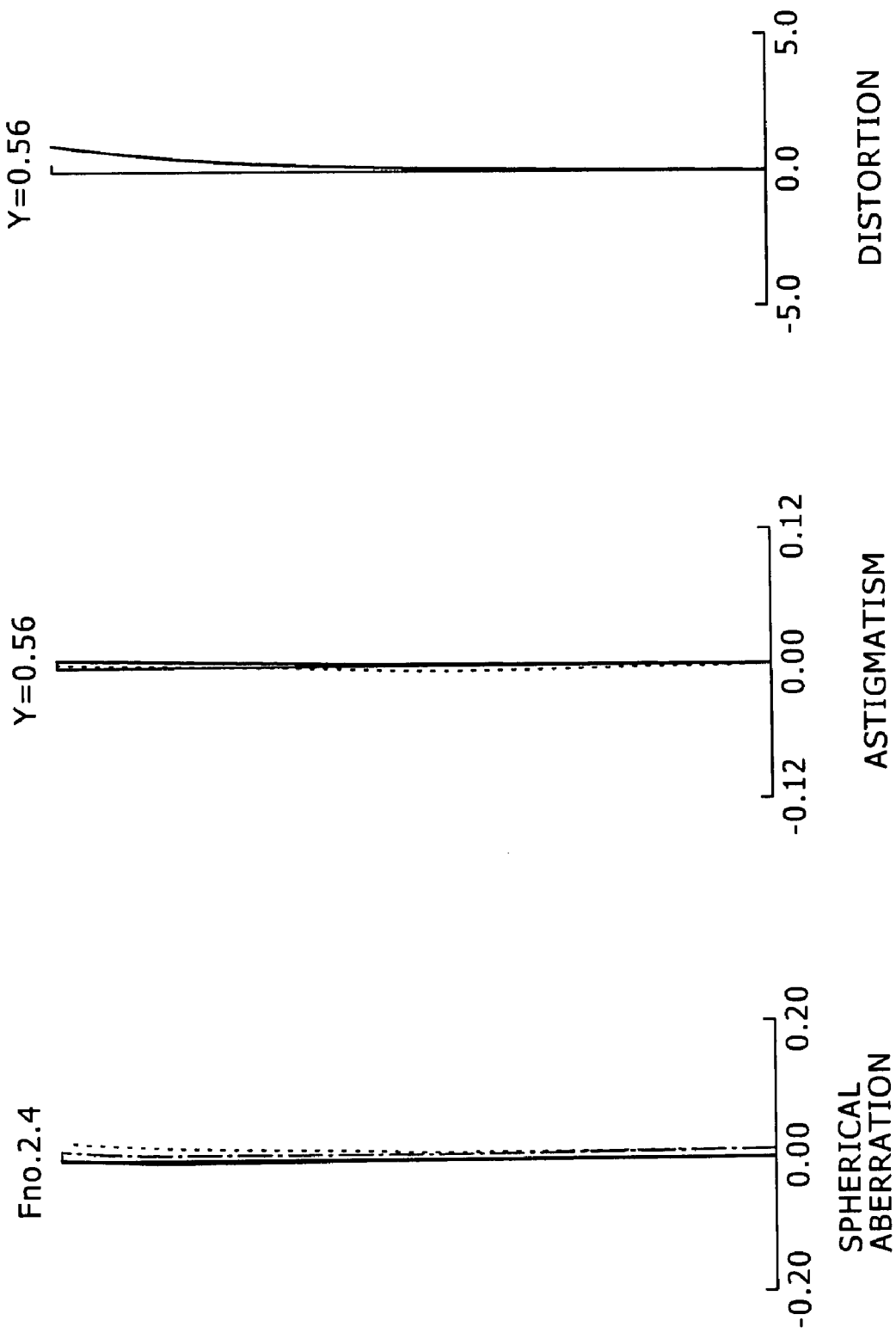
FIG. 19 illustrates the spherical aberration, astigmatism and distortion for a mid-focal length.
Figure 20:
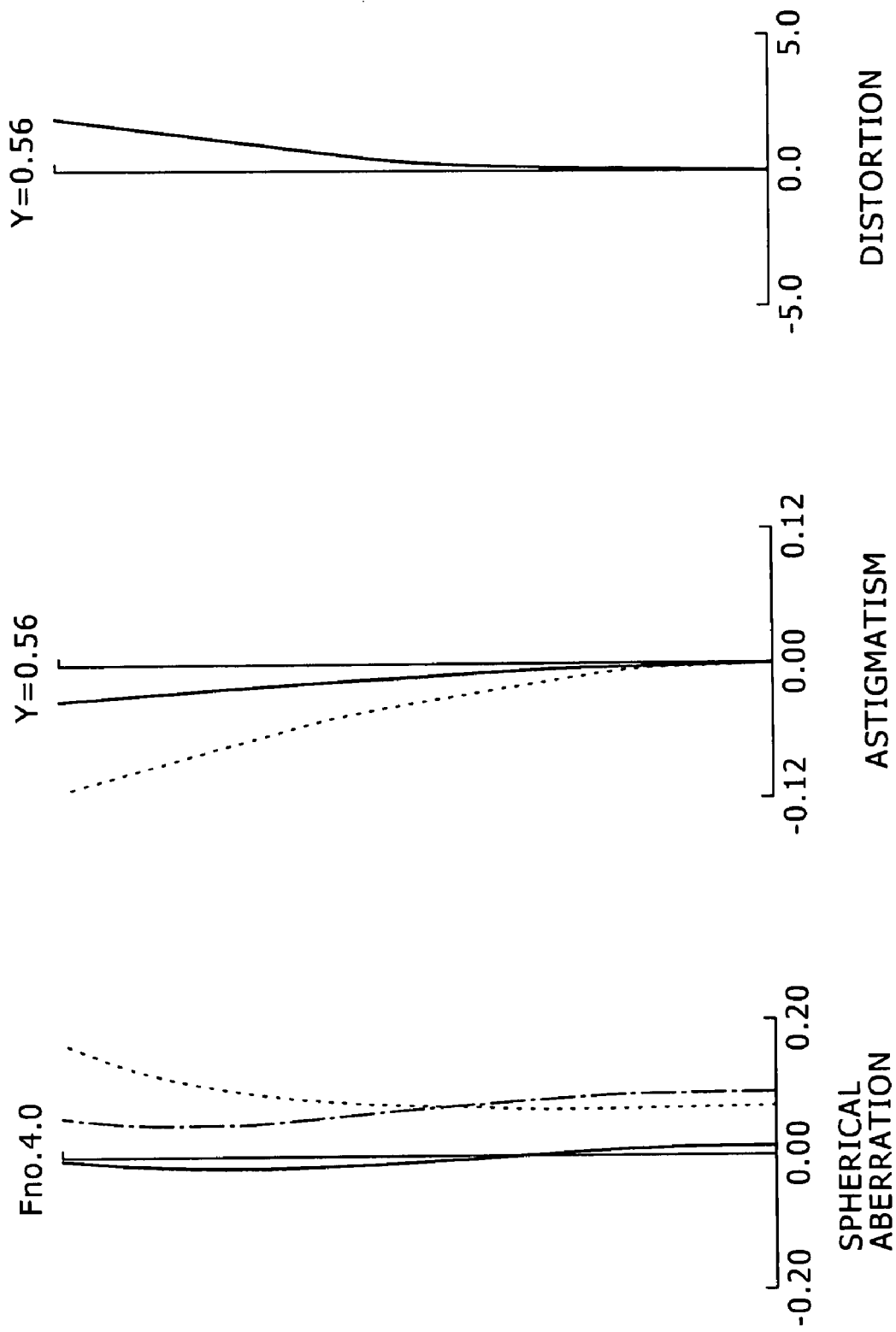
FIG. 20 illustrates the spherical aberration, astigmatism and distortion for a maximum telephoto state.
Figure 21:
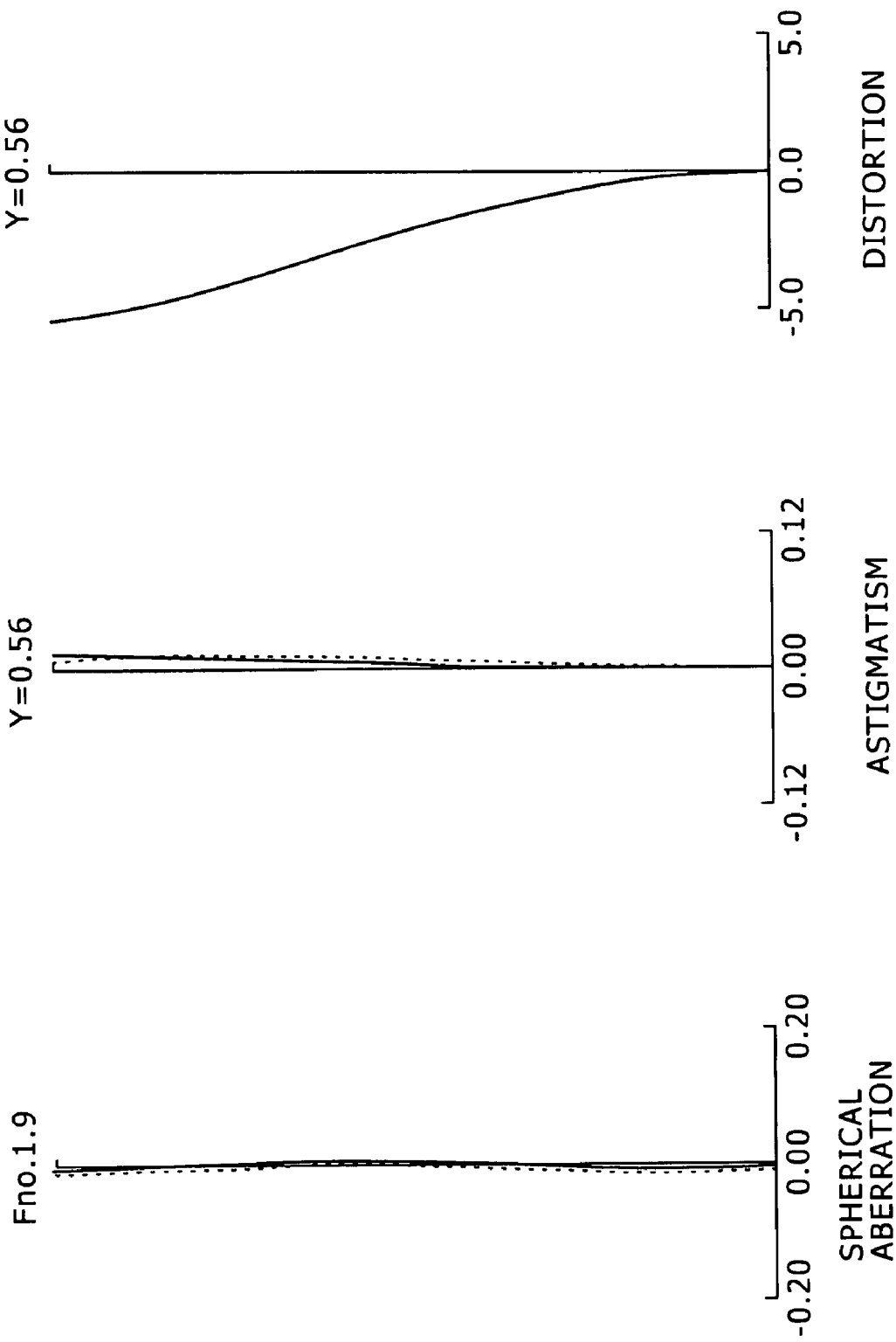
FIG. 21 shows, together with FIGS. 22 and 23, various aberration graphs according to the numerical embodiment 3 provided by application of the specific numerical values to the third embodiment of the zoom lens of the present invention when an object distance is of 2 m, and the graphs in FIG. 21 illustrate the spherical aberration, astigmatism and distortion for a maximum wide-angle state.
Figure 22:
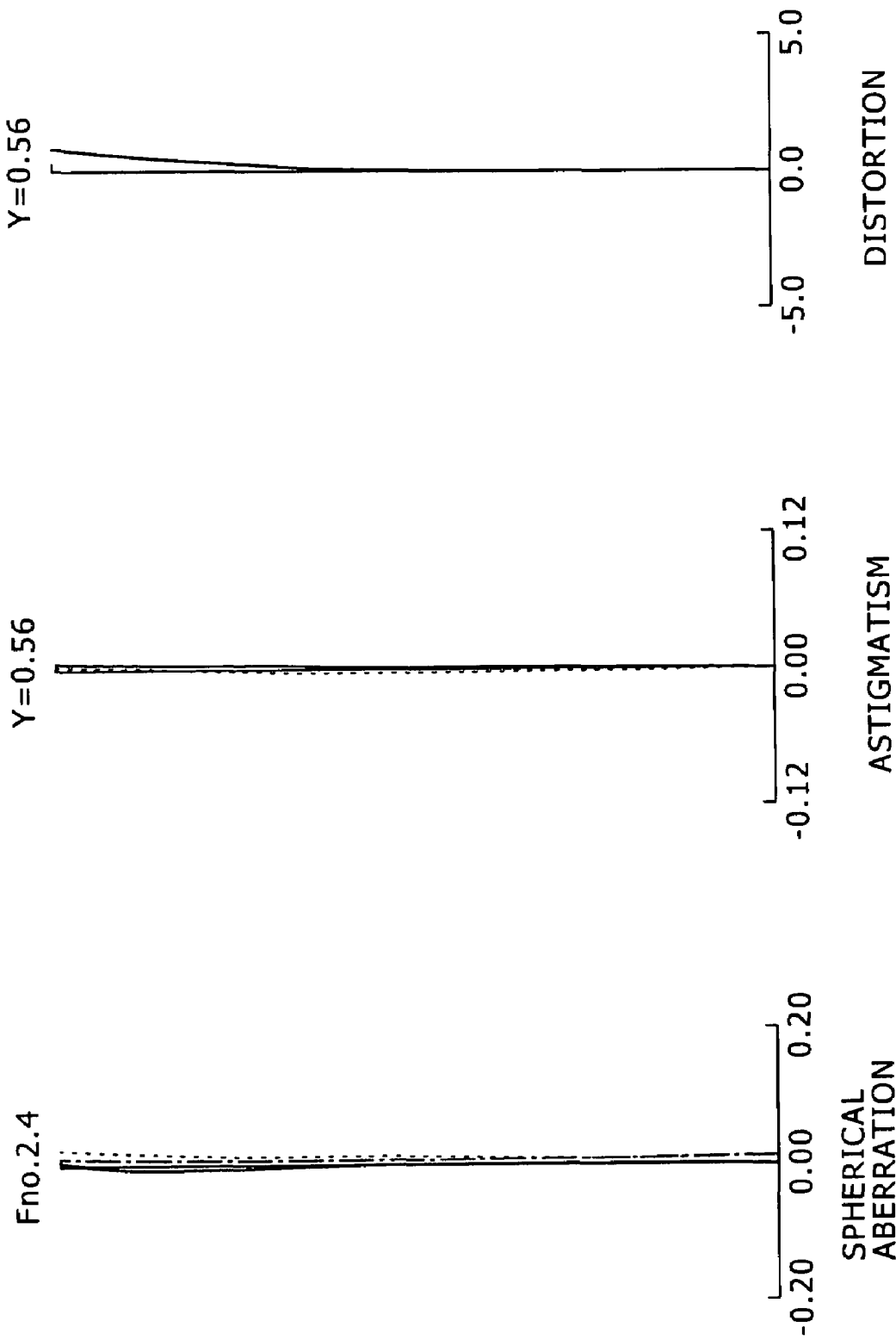
FIG. 22 illustrates the spherical aberration, astigmatism and distortion for a mid-focal length.
Figure 23:
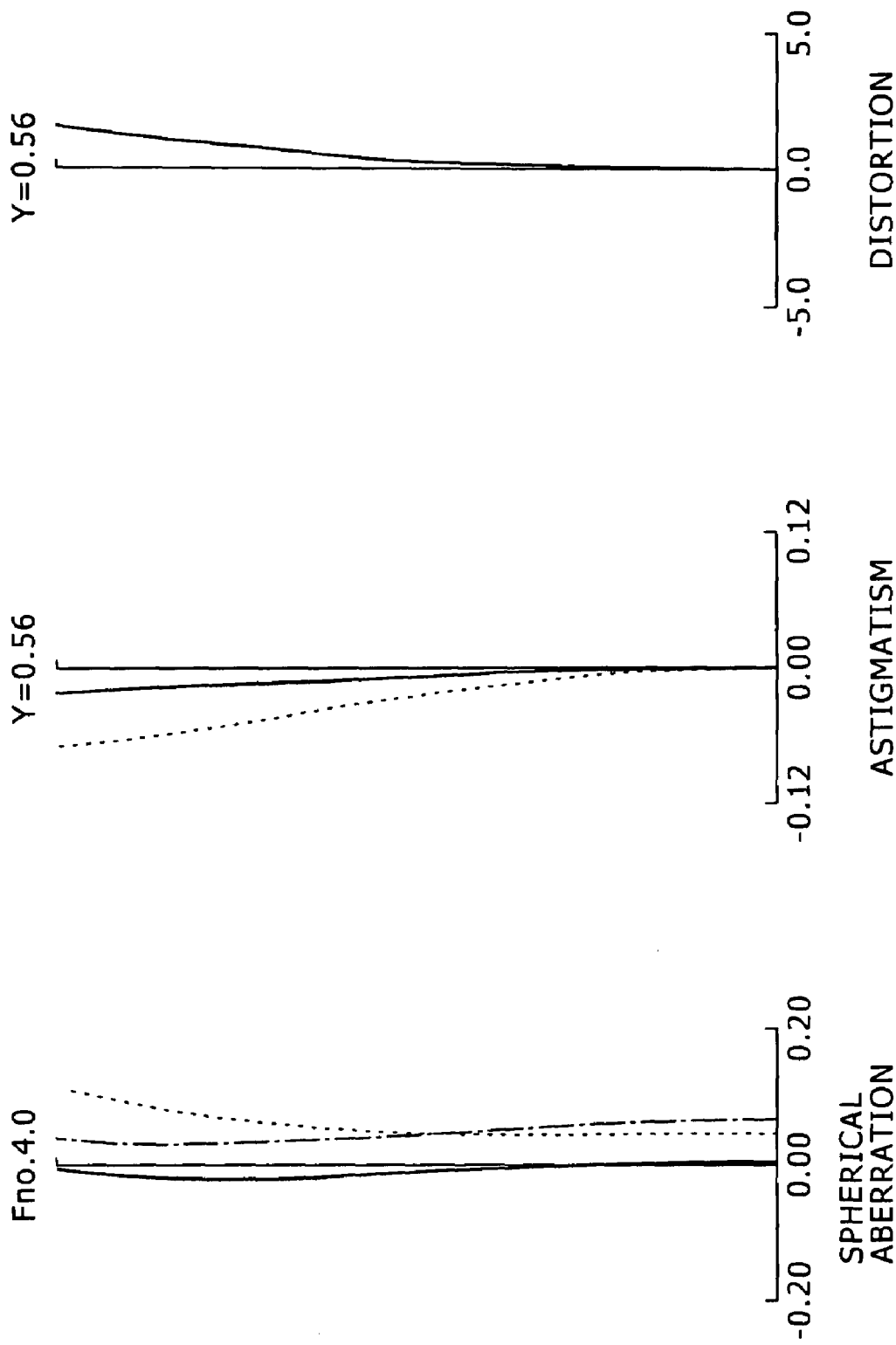
FIG. 23 illustrates the spherical aberration, astigmatism and distortion for a maximum telephoto state.
Figure 24:
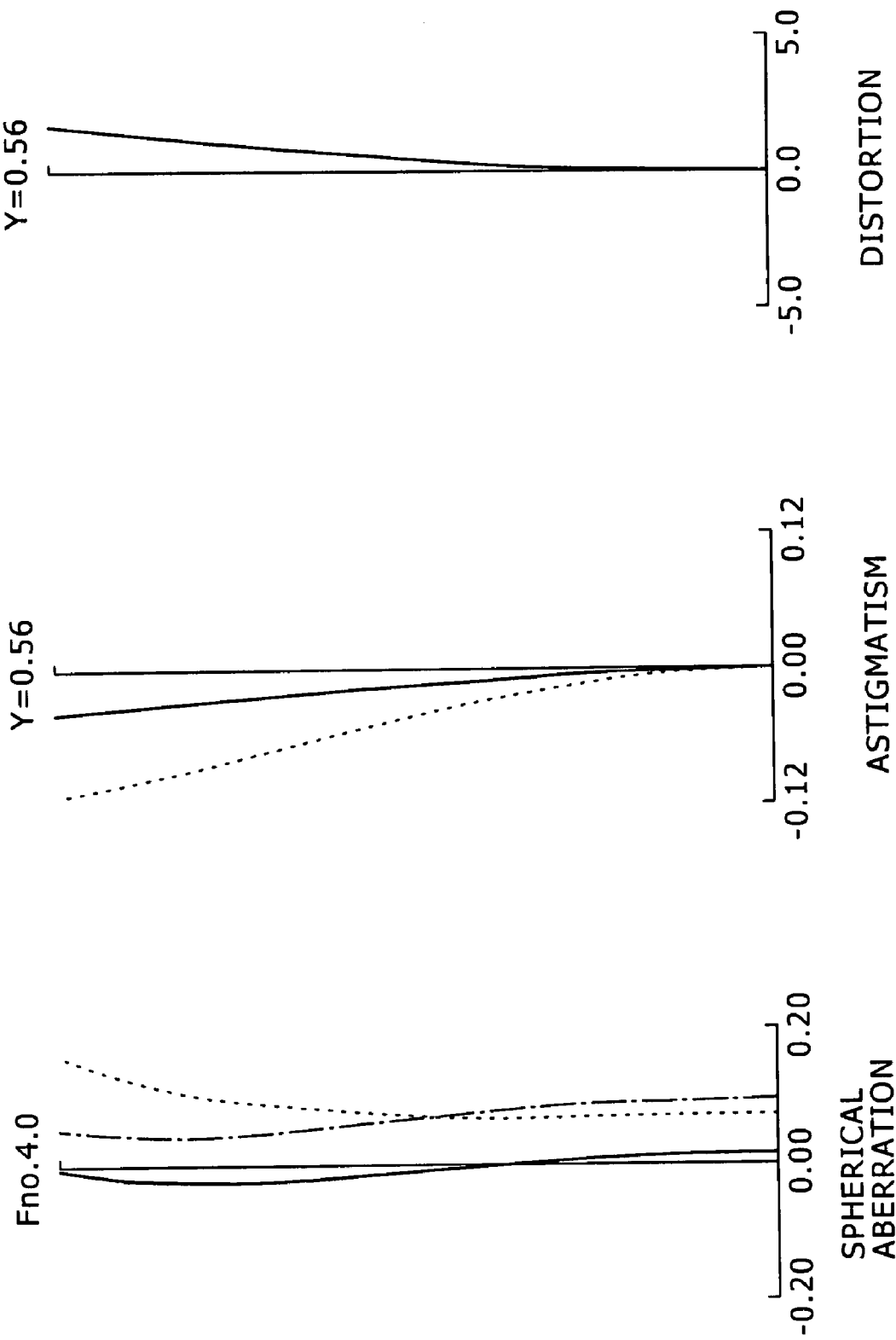
FIG. 24 illustrates the spherical aberration, astigmatism and distortion at a maximum telephoto state according to the numerical embodiment 3 provided by application of the specific numerical values to the third embodiment of the zoom lens of the present invention in a case where an aspherical surface included in the fifth lens group is replaced with a paraxial spherical surface thereof when an object distance is of infinity.

FIGS. 18 to 20 show a spherical aberration graph, an astigmatism graph and a distortion graph for the maximum wide-angle state (f=1.00), the mid-focal length (f=6.30) and the maximum telephoto state (f=39.74) according to the numerical embodiment 3 when the object distance is of infinity. FIGS. 21 to 23 show a spherical graph, an astigmatism graph and a distortion graph for the maximum wide-angle state, the mid-focal length and the maximum telephoto state according to the numerical embodiment 3 when the object distance is of 2 m. FIG. 24 shows a spherical aberration graph, an astigmatism graph and a distortion graph with respect to the maximum telephoto state according to the numerical embodiment 3 when the aspherical surfaces R18, R19 included in the fifth lens group GR5 are replaced with the paraxial spherical surfaces thereof when the object distance is of infinity.

It is noted that in the spherical aberration graphs, a solid line indicates values with respect to the d-line, a broken line indicates values with respect to the g-line (435.8 nm in wavelength), and a chain line indicates values with respect to the C-line (656.3 nm in wavelength). In the astigmatism graphs, a solid line indicates values with respect to the sagittal image plane, and a broken line indicates values with respect to the meridional image plane.

An image capture apparatus of the present invention is now described.

The image capture apparatus of the present invention includes a zoom lens and an imaging device for converting an optical image formed by the zoom lens into electric signals. The zoom lens includes, in order and from the side of an object, a first lens group having a positive refractive power and fixed in position, a second lens group having a negative refractive power and movable in position for providing mainly zooming, a third lens group having a positive refractive power and fixed in position, a fourth lens group having a positive refractive power and movable in position for performing a focal position correction due to the zooming and to provide focusing, and a fifth lens group including a single lens fixed in position. Each of the lens groups from the third lens group to the fifth lens group has at least one aspherical surface, and conditional equations (1) and (2) shown below are satisfied.

$$|f4/f5|<0.12 \quad (1)$$

$$0.9<\beta 5<1.2 \quad (2)$$

The lens configuration enables a high image quality and a high zoom ratio to be achieved, with a small device size.

Figure 25:
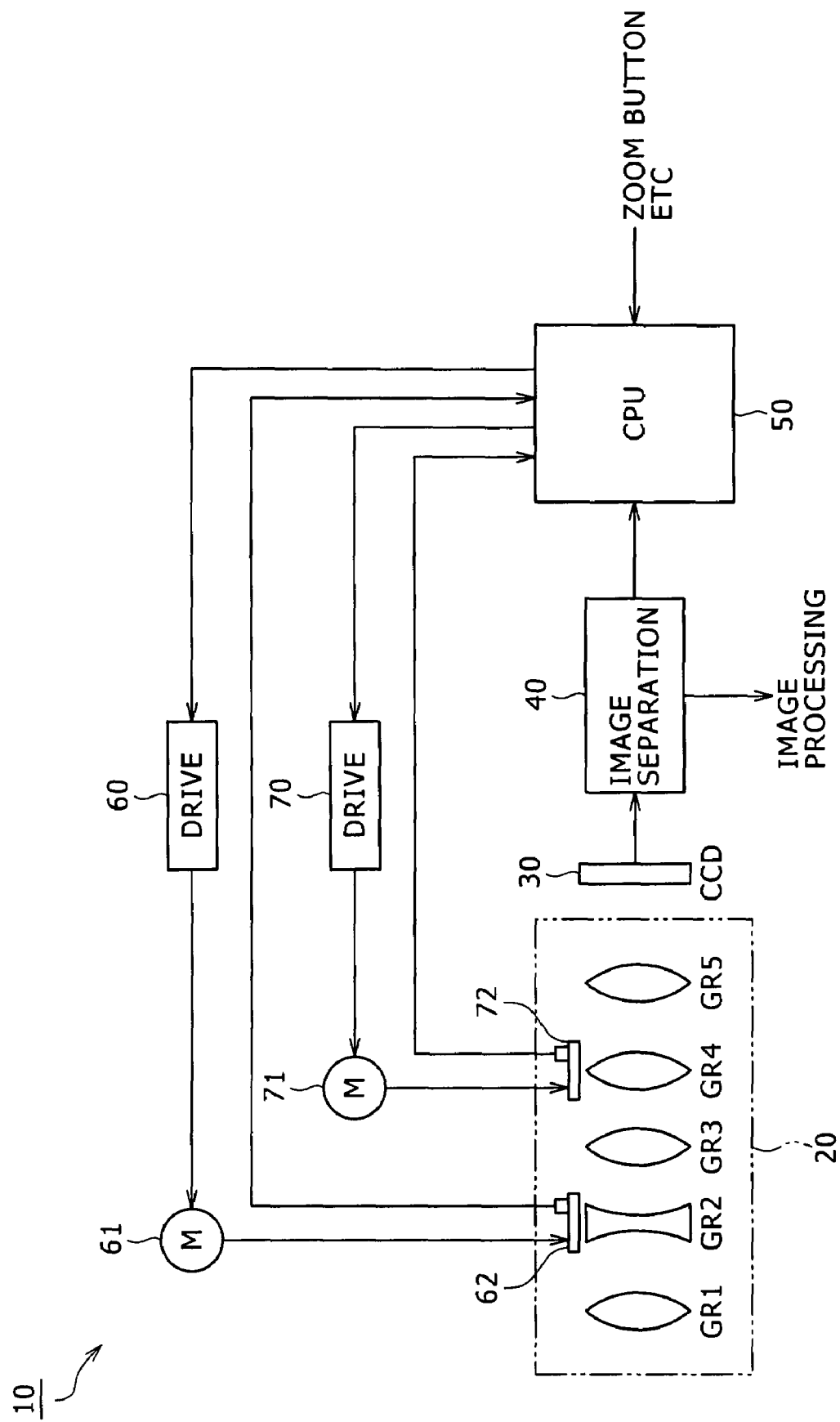
FIG. 25 is a block diagram showing one embodiment of an image capture apparatus according to the present invention.

FIG. 25 is a block diagram showing one embodiment of the image capture apparatus according to the present invention.

An image capture apparatus 10 includes a zoom lens 20 and an imaging device 30 for converting the optical image formed by the zoom lens 20 into electric signals. It is noted that as examples of the imaging device 30, for instance, those involving use of photoelectric transducers such as CCDs and CMOSs are applicable. The zoom lens according to the present invention may be applied to the zoom lens 20. In FIG. 25, there is shown the zoom lens 1A according to the first embodiment in FIG. 1 in such a simplified manner that each lens group is shown in the shape of a single lens. Instead of the zoom lens 1A according to the first embodiment, it is, of course, allowable to use the zoom lenses 1B and 1C according to the second and the third embodiments or any types of zoom lenses according to the present invention having configurations different from those disclosed in the present specification.

The electric signals formed by the imaging device 30 are sent, through an image separation circuit 40, to a control circuit 50 as focus control signals, and to an image processing circuit as image signals. The signals accepted by the image processing circuit undergo processing into the form of signals adaptable for subsequent processing, followed by being provided for various processes such as displaying by a display apparatus, recording to a recording medium, transferring by communications means and the like.

External operation signals such as those given by operations through a zoom button and the like, for instance, are inputted to the control circuit 50, causing various processes to be performed in response to these operation signals. Input of a zoom command through the zoom button, for instance, is followed by making drive sections 61, 71 operative through driver circuits 60, 70 such that the focal length be brought to a state based on the command inputted, causing each of the lens groups GR2, GR4 to be moved to predetermined positions. Positional information regarding each of the lens groups GR2, GR4 obtained through respective sensors 62, 72 is inputted to the control circuit 50, and are then supposed to be referred to in outputting command signals to the drive circuits 60, 70. The control circuit 50 also provides positional control of the fourth lens group GR4 by, after checking the focus state based on signals sent from the image separation circuit 40, making the drive section 71 operative through the driver circuit 70 in order to obtain the optimal focus state. The image capture apparatus 10 may take various forms when applied to products. For instance, it is allowable to provide wide applications to various cameras such as digital still cameras and digital video cameras, or as a camera section of digital input/output apparatuses such as mobile phones integrated with cameras or PDAs integrated with cameras.

It is noted that the specific forms of the various sections and the numerical values contained in the embodiments and the numerical embodiments having been described herein are only illustrative for the purpose of implementing the present invention, and the scope of the invention should be construed as illustrative and not in a limiting sense thereby.

The present application contains subject matters related to Japanese Patent Application No. 2006-153511 filed in Japanese Patent Office on Jun. 1, 2006, the entire content of which being incorporated herein by reference.

It should be understood by those skilled in the art that various modifications, combinations, sub-combinations, and alterations may occur depending on design requirements and other factors insofar as they are within the scope of appended claims and equivalents thereof.

What is claimed is:

1. A zoom lens comprising, in order and from the side of an object, a first lens group having a positive refractive power and fixed in position, a second lens group having a negative refractive power and movable in position for providing mainly zooming, a third lens group having a positive refractive power and fixed in position, a fourth lens group having a positive refractive power and movable in position for performing a focal position correction due to the zooming and for focusing, and a fifth lens group including a single lens fixed in position, wherein each of the lens groups from the third lens group to the fifth lens group has at least one aspheric surface, and conditional equations (1) and (2) below are satisfied, $$|f4/f5|<0.12 \quad (1)$$

$$0.9<\beta 5<1.2 \quad (2)$$

where f4 is a focal length of the fourth lens group, f5 is a focal length of the fifth lens group, and $\beta 5$ is a transverse magnification of the fifth lens group.

2. The zoom lens according to claim 1, wherein the third lens group includes a single lens having a positive refractive power, and the fourth lens group includes a triple cemented lens including a lens having a positive refractive power, a lens having a negative refractive power and a lens having a positive refractive power.

3. The zoom lens according to claim 1 or 2, wherein a shape of an aspherical surface included in the fifth lens group meets conditional equations (3) and (4) below, $$|MTa/MTs|<1.0 \quad (3)$$

$$|(STa-STs)/STa|<1.0 \quad (4)$$

where

MTa is a curvature of field in a meridional direction with respect to a maximum image height at a maximum telephoto state, MTs is a curvature of field in a meriodinal direction with respect to the maximum image height at the maximum telephoto state when the aspherical surface included in the fifth lens group is replaced with a paraxial spherical surface thereof, STa is spherical aberration that occurs during full-aperture at the maximum telephoto state, and STs is spherical aberration that occurs during full-aperture at the maximum telephoto state when the aspherical surface included in the fifth lens group is replaced with the paraxial spherical surface thereof.

4. An image capture apparatus comprising a zoom lens, and an imaging device for converting an optical image formed by the zoom lens into electric signals, wherein the zoom lens includes, in order and from the side of an object, a first lens group having a positive refractive power and fixed in position, a second lens group having a negative refractive power and movable in position for providing mainly zooming, a third lens group having a positive refractive power and fixed in position, a fourth lens group having a positive refractive power and movable in position for performing a focal position correction due to the zooming and to provide focusing, and a fifth lens group including a single lens fixed in position, wherein each of the lens groups from the third lens group to the fifth lens group having at least one aspherical surface, and conditional equations (1) and (2) shown are satisfied, $$|f4/f5|<0.12 \quad (1)$$

$$0.9<\beta 5<1.2 \quad (2)$$

where f4 is a focal length of the fourth lens group, f5 is a focal length of the fifth lens group, and $\beta 5$ is a transverse magnification of the fifth lens group.

\* \* \* \* \*